Dec. 15, 1959 E. T. BURTON ET AL 2,917,583

TIME SEPARATION COMMUNICATION SYSTEM

Filed June 26, 1953 30 Sheets-Sheet 1

INVENTORS E. T. BURTON
A. L. ROBINSON
E. L. YOUNKER

BY [signature]

ATTORNEY

INVENTORS E. T. BURTON
A. L. ROBINSON
E. L. YOUNKER
BY [signature]
ATTORNEY

TIME SEPARATION COMMUNICATION SYSTEM

Filed June 26, 1953 30 Sheets-Sheet 3

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY [signature]
ATTORNEY

TIME SEPARATION COMMUNICATION SYSTEM

Filed June 26, 1953 30 Sheets-Sheet 5

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY
[signature]
ATTORNEY

INVENTORS E. T. BURTON
A. L. ROBINSON
E. L. YOUNKER
BY [signature]
ATTORNEY

TIME SEPARATION COMMUNICATION SYSTEM

Filed June 26, 1953 30 Sheets-Sheet 8

INVENTORS E. T. BURTON
A. L. ROBINSON
E. L. YOUNKER
BY [signature]
ATTORNEY

Dec. 15, 1959 E. T. BURTON ET AL 2,917,583

TIME SEPARATION COMMUNICATION SYSTEM

Filed June 26, 1953 30 Sheets-Sheet 9

INVENTORS E. T. BURTON
A. L. ROBINSON
E. L. YOUNKER

BY [signature]

ATTORNEY

INVENTORS E. T. BURTON
A. L. ROBINSON
E. L. YOUNKER
BY
ATTORNEY

TIME SEPARATION COMMUNICATION SYSTEM

Filed June 26, 1953 30 Sheets-Sheet 11

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY [signature]
ATTORNEY

TIME SEPARATION COMMUNICATION SYSTEM

Filed June 26, 1953 30 Sheets-Sheet 13

INVENTORS E. T. BURTON
A. L. ROBINSON
E. L. YOUNKER
BY James W. Falk
ATTORNEY

Dec. 15, 1959 E. T. BURTON ET AL 2,917,583

TIME SEPARATION COMMUNICATION SYSTEM

Filed June 26, 1953 30 Sheets-Sheet 14

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY [signature]
ATTORNEY

TIME SEPARATION COMMUNICATION SYSTEM

INVENTORS E. T. BURTON
A. L. ROBINSON
E. L. YOUNKER
BY
[signature]
ATTORNEY

INVENTORS E. T. BURTON
A. L. ROBINSON
E. L. YOUNKER
BY
ATTORNEY

Dec. 15, 1959 E. T. BURTON ET AL 2,917,583

TIME SEPARATION COMMUNICATION SYSTEM

Filed June 26, 1953 30 Sheets-Sheet 20

INVENTORS E. T. BURTON
A. L. ROBINSON
E. L. YOUNKER

BY [signature]

ATTORNEY

INVENTORS E. T. BURTON
A. L. ROBINSON
E. L. YOUNKER
BY [signature]
ATTORNEY

INVENTORS E. T. BURTON
A. L. ROBINSON
E. L. YOUNKER
BY
James W. Falk
ATTORNEY

TIME SEPARATION COMMUNICATION SYSTEM

Filed June 26, 1953

INVENTORS E. T. BURTON
A. L. ROBINSON
E. L. YOUNKER
BY [signature]
ATTORNEY

Dec. 15, 1959 E. T. BURTON ET AL 2,917,583

TIME SEPARATION COMMUNICATION SYSTEM

Filed June 26, 1953 30 Sheets-Sheet 24

INVENTORS E. T. BURTON
A. L. ROBINSON
E. L. YOUNKER
BY [signature]
ATTORNEY

TIME SEPARATION COMMUNICATION SYSTEM

Filed June 26, 1953 30 Sheets-Sheet 25

INVENTORS E. T. BURTON
A. L. ROBINSON
E. L. YOUNKER

BY James J. Falk

ATTORNEY

Dec. 15, 1959 E. T. BURTON ET AL 2,917,583

TIME SEPARATION COMMUNICATION SYSTEM

Filed June 26, 1953 30 Sheets-Sheet 26

INVENTORS E. T. BURTON
A. L. ROBINSON
E. L. YOUNKER

BY James W. Falk

ATTORNEY

INVENTORS E. T. BURTON
A. L. ROBINSON
E. L. YOUNKER
BY
ATTORNEY

INVENTORS: E. T. BURTON
A. L. ROBINSON
E. L. YOUNKER
BY [signature]
ATTORNEY

INVENTORS: E. T. BURTON
A. L. ROBINSON
E. L. YOUNKER
BY [signature]
ATTORNEY

TIME SEPARATION COMMUNICATION SYSTEM

INVENTORS: E. T. BURTON
A. L. ROBINSON
E. L. YOUNKER

BY [signature]

ATTORNEY

United States Patent Office 2,917,583

Patented Dec. 15, 1959

2,917,583

TIME SEPARATION COMMUNICATION SYSTEM

Everett T. Burton, Millburn, Albert L. Robinson, Short Hills, and Elmer L. Younker, Madison, N.J., assignors to Bell Telephone Laboratories, Incorporated, New York, N.Y., a corporation of New York Application June 26, 1953, Serial No. 364,258

28 Claims. (Cl. 179—15)

This invention relates to communication systems and more particularly to a time division or time separation telephone exchange.

It is presently general practice that a connection through a telephone exchange, as between a calling and a called line or a calling line and an intra-office trunk, be a unique path defined by relays or other switching elements. Each such path is individual to the connection that that has been set up and is assigned to that connection for the duration of the call. Thus, a certain amount of equipment, depending on the number of lines served and the expected frequency of service, may be considered as being in a pool where it can be chosen and assigned for a particular call.

This conventional switching arrangement has become known as space separation and privacy of conversation is assured by the separation of individual conversations in space.

It is known, however, that connections between a calling and a called line may also be made by sharing a single path on a time division or time separation basis. In a time separation system, privacy of the conversation is assured by separation of individual conversations in time. In such an arrangement, the single transmission path is shared by a number of calls at different time intervals, the intervals during which any call is present exclusively on the path being extremely short but recurring periodically and at a very high rate. The transmission connection thus established between any two lines is open a portion of the time but closed at definite and very short intervals. These intervals are of very short duration; short and relatively high amplitude pulses corresponding to the desired characteristics of the voice or other signal are transmitted in these intervals. These pulses serve to supply the flow of information required to rebuild the voice current in the called line so that reception of voice signals through such a time separation system is quite satisfactory.

In such a time separation system, it is essential to be able to identify or remember which lines have been assigned which time intervals or time slots in the constantly recurring office cycle. Priorly this has been done by employing two cathode beam tubes each having a plurality of targets assigned and connected to individual lines. When a connection is to be set up between two lines, the scanning rates may be shifted so that the two targets, in the two tubes, individual to those lines are scanned simultaneously, or, alternatively, the information from the one line may be delayed and not applied to the second tube until that tube is scanning the other line. Systems of these types are described in L. Espenschied Patent 2,379,221, June 26, 1945, and P. R. Adams-D. H. Ransom Patent 2,492,344, December 27, 1949.

The employment of such tubes in the talking path introduces considerable loss as cathode ray tubes are low current, low power output devices. Additionally, the memory requirements and the gating under control of the memory become onerous in such systems particularly for use in larger size offices.

It is a general object of this invention to provide an improved time separation communication system.

It is another object of this invention to provide an improved time separation telephone system in which gating of the talking paths to a single common talking connection is attained without the employment of cathode ray tubes.

It is a further object of this invention to simplify the memory circuits in a time separation telephone office.

A still further object of this invention is to maintain the control signals in the memory system in synchronism with the operation of the other circuits in the time separation system.

It is still another object of this invention to provide improved combinations of circuits for a time separation communication system.

These and other objects of this invention are attained in one specific illustrative embodiment wherein a plurality of subscriber lines and a plurality of trunks are each individually connected to a single common talking bus or path through gate circuits, which may advantageously comprise electron discharge devices. Each of the trunks is assigned a time position or time slot in an office cycle; in addition, a number of time slots in the office cycle are assigned to special functions. Each of the lines is assigned a code, and when a connection is to be made between a given line and a given trunk, the code of the line is inserted into the time slot assigned to the trunk, as described further below.

The trunk gate circuits are actuated in succession by signals applied, through a translator circuit, from a trunk sequence circuit. Each trunk is thus connected in succession to the single common talking bus. The line gates are also actuated by signals applied through a translator, but the signals are received from a memory circuit. In accordance with one aspect of this invention, when a line is to be connected to a particular trunk, the code of that line is inserted into the time slot of that trunk in a circulating memory. The circulating memory is a closed loop including a delay line in which a plurality of channels are provided by frequency separation so that any number of digits of a code may be simultaneously circulating in a particular time slot in the memory. The delay of the delay line and of that inherent in the closed memory loop is exactly one office cycle. At the end of the office cycle, if the line whose code is circulating is still to be connected to the trunk assigned that time slot, the code is regenerated in the memory; if the connection is not to be maintained, the code is erased.

In accordance with one aspect of this invention, one channel of the circulating memory is reserved for synchronizing signals which serve to mark the start of each time slot and which therefore serve to pace all the timed circuit functions of the entire system. As the synchronizing signals circulate in the memory loop through the same delay line or lines as the line codes, deviation between them is prevented; and the proper timing of all circuit functions is thus assured.

The memory loop contains a reading point, which is advantageously at or just prior to the writing or regenerating point, through which the pulses pass once per office cycle and thus once per time of travel around the loop. The code pulses are obtained at this reading point for application to the line translator to control the line gates.

Pulses appearing in time slots on the common talking bus are detected and applied to appropriate circuits for the setting up of connections. Thus, when a line or a trunk is requesting service, a pulse is detected which actuates subsequent service circuits. If a trunk is requesting service, the time slot of that particular trunk is seized, blocking other trunks from the circuits utilized in setting up a connection, and dial pulses are registered. A test is then made to determine if the called line is busy. If it is, the code of a special busy line is written into the circulating memory in the time slot of that trunk and the connection to receive busy tone is thus established.

If a line is requesting service, this is detected in a time slot reserved for this function, each idle line being connected to the common bus in succession in this particular time slot. If during this line scanning process, an off-hook condition is detected, the scanning time slot is seized by that line and held while dialing is in progress. The dialed number is registered and compared with the codes of the trunk, as presented by the trunk sequence circuit. When a match is found, the calling line code is inserted into the circulating memory in the time slot of that line and the connection thus made. If the trunk is busy, and assuming no other available trunks to the called office, the calling line code is written in the time slot assigned to a busy tone, so that the busy tone is applied to the calling line.

It is a feature of this invention tthat each trunk in a time separation switching system be assigned a time position in an office cycle and that connections through the system be determined by associating the code of a line with a particular time slot. Discrimination between lines will thus occur because of the unique code of the line and its time position in the repeated office cycle.

It is a further feature of this invention that each of the lines and trunks in a time separation switching system be connected to a single common bus or path through the system by gates, the gates of the trunks being enabled cyclically in time sequence and the gates of the busy lines being enabled cyclically by signals from a dynamic memory. More specifically, it is a feature of this invention that the trunk gates be enabled in time sequence by the output signals of a counting circuit whose input is signals from a master synchronizer and that the dynamic memory contain information regarding which lines are busy and precisely which busy line is to be connected to the common path in each time slot.

It is another feature of this invention that the dynamic memory of a time separation switching system comprise a closed loop in which coded information may circulate, the loop including a delay line such that the total delay of the closed loop is exactly one office cycle. More specifically, in accordance with this feature of the invention, the coded information identifying a particular line can be inserted in the closed loop in the time slot of a particular trunk, regenerated on completion of each passage through the closed loop, and selectively altered or erased without effect upon information circulating in other time slots or positions in the memory loop.

It is a further feature of this invention that a number of channels, separated by different frequencies, may be passed through the delay line of the memory loop, the information in the different channels in any time slot being a code identifying the line to be connected to the trunk assigned that time slot.

It is a still further feature of this invention that one of these multiple channels in the circulating memory be used as part of a feedback loop of a generator of synchronizing signals, thereby eliminating trouble due to variations in delay time as all channels utilizing a single delay line will tend to drift by the same amount.

It is another feature of this invention that certain of the time slots be assigned to special functions. Thus, it is a feature of this invention that one time slot be reserved for scanning the lines to determine if a line, not busy on a prior connection, is requesting service. Therefore, the codes of idle lines are inserted into the circulating memory in this time slot in succession and erased after one passage through the closed memory loop.

It is a further feature of this invention that service circuits to be utilized in setting up a particular connection through a time separation switching system include a one office cycle delay circuit in which a signal circulates in synchronism with a time slot in the office cycle and a circuit for deriving two outputs actuated with the one office cycle delay circuit, one output identifying the time position of the originating signal and enabling the service circuits to perform operations on information received in the time slot of that signal and the other providing a blanking voltage during the occurrence of all time slots other than that occupied by the originating signal.

It is a still further feature of this invention that the erasure of information in the circulating memory occur only after the recognition of the absence of pulses on the common bus in the time slot of the connection, thereby preventing erasure on momentary disappearance of voltage. In accordance with this feature of the invention, a delayed erase pulse generator is provided which is slow in response to an applied input and whose response will be interrupted by the reappearance of a voltage on the common bus in that time slot.

A complete understanding of this invention and of the above noted and other features thereof may be gained from consideration of the following detailed description with reference to the accompanying drawing, in which.

Figures 1, 31:
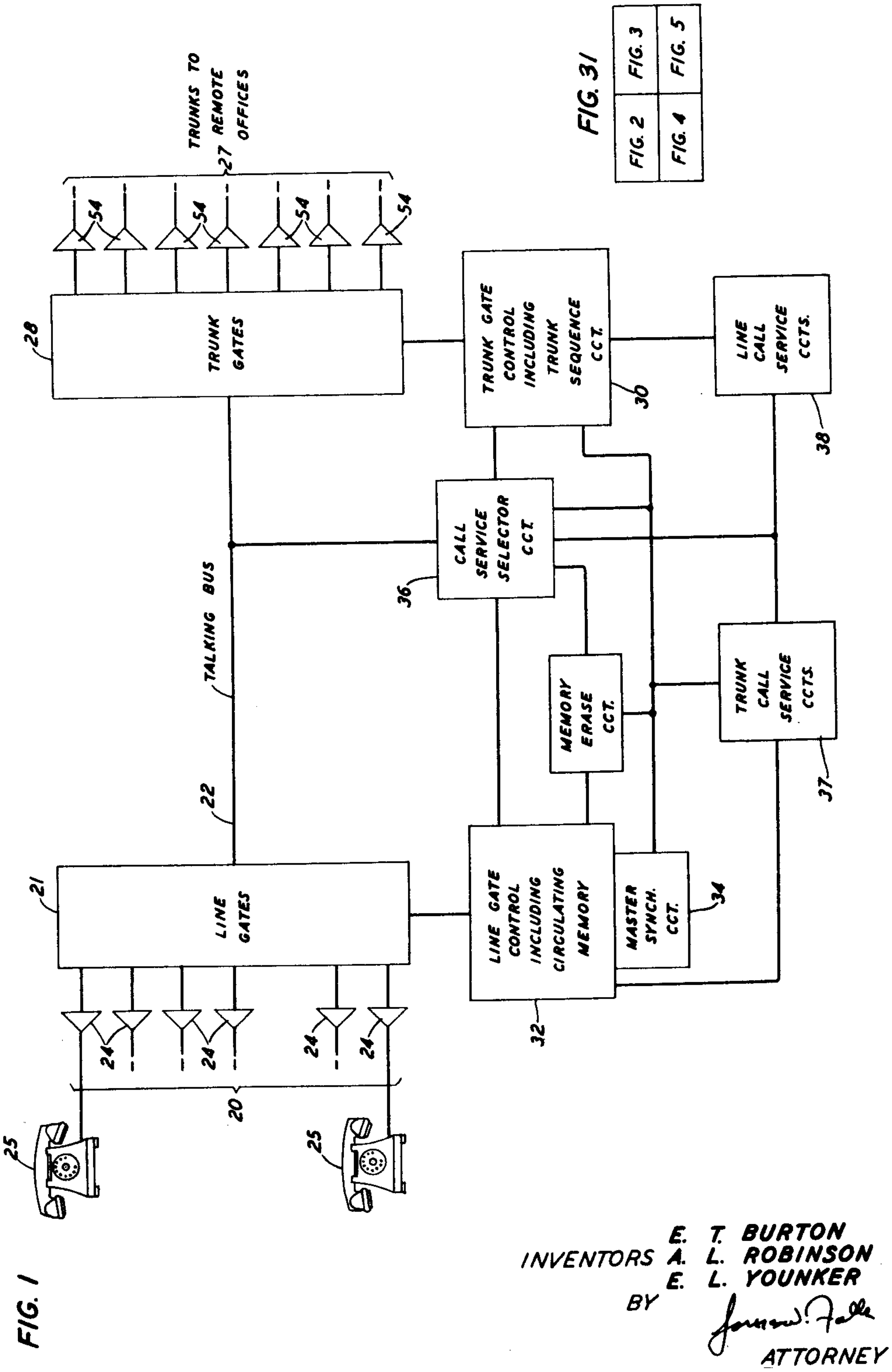
Fig. 1 is a simplified block diagram representation of one specific illustrative embodiment of this invention.

Turning now to the drawing, the basic elements of a time separation telephone exchange illustrative of one specific embodiment of this invention are depicted in Fig. 1. As there seen, a plurality of subscriber lines 20 are each connected through an individual line gate 21 to a single common talking bus 22. An amplifier 24 is advantageously connected in each subscriber line 20 between the subscriber telephone 25 and the line gates 21. Similarly a plurality of trunks 27, which may each extend to a distant office, are individually connected to the single common talking bus 22 by trunk gates 23. Each of the trunk gates is enabled in a regular sequence by a trunk gate control circuit 30 which includes a trunk sequence circuit, which may advantageously be a binary counter circuit of the type disclosed in Patent 2,828,071, issued March 25, 1958, of E. T. Burton. The binary counter circuit recycles continuously after a specific number of steps, depending on the number of trunks which may be connected to the talking bus 22. In the specific illustrative embodiment described herein, seven trunks 27 are employed and the binary counter, for reasons further described below, recycles after each ten steps. Each individual step defines the time slot of a particular trunk and the ten steps together define the office cycle of the time separation exchange. Only seven trunks extend from the talking bus 22 to remote offices; the remaining time slots are assigned, by the trunk gate control circuit 30 to control functions within the exchange, as described further below.

The trunk control gate also advantageously includes a trunk transaltor circuit which converts the binary code, from the sequence circuit, to sequential time pulses and applies them in sequence to the respective trunk gates.

The line gates are operated under control of information from a regenerative memory system included in the line gate control circuit 32. Advantageously memory information takes the form of binary digits which circulate in a loop containing an acoustic delay line, which may be of the fused silica type as described in Patent 2,672,590, issued March 16, 1954, to H. J. McSkimin. Fused silica delay lines are also discussed in an article "Performance of Ultra Sonic Vitreous Silica Delay Lines" by M. D. Fagen in the Proceedings of the National Electronics Conference, 1951, vol. 7, at page 380 and in an article "Ultra Sonic Delay Lines" by D. L. Arenberg in the Journal of the Acoustical Society of America, 1948, vol. 20, page 1. Each of the line gates 21 is identified by a code and a particular line 20 is active while its code is in the memory system. During this time the line gate 20 is enabled once per office cycle in the time slot assigned to the trunk to which the line is connected through the exchange. As used herein the term "time slot" is defined as the time during which one trunk gate is enabled, as described above, and thus during which one conversation may be sampled over the common talking bus 22. The term may be used to denote either the length of the interval of time or the relative position of such an interval in an office code.

The code may advantageously be in binary form. For purposes of simplicity of exposition the specific illustrative embodiment of this invention described herein is assumed to employ only six different subscribers' lines 20 so that only six different line codes in addition to one special code, described below, and the null are required. It is of course to be understood that in a full size office a considerably larger number of subscribers' lines would be connected by line gates 21 to a single common talking bus 22, in accordance with the principles of this invention. As only seven different codes and the null are utilized in this specific embodiment, but three binary digits need be employed. Three frequency separated channels in the delay line permit the simultaneous circulation of the three digits of a code. Binary codes employing a larger number of digits would of course be employed for a full scale office, a separate channel being assigned to each digit.

A master synchronizing circuit 34, which generates a synchronizing signal to mark the start of each time slot, serves to pace all timed circuit functions. The synchronizing signals may advantageously be derived from a sine wave whose frequency is determined by the delay of the fused silica delay line, as described further below.

A call service selector circuit 36 receives pulse information from the common talking bus 22, from the circulating memory, from the trunk gate control circuit 30, and from the master synchronizing circuit 34. This selector circuit 36 recognizes the presence or absence of pulses, analyzes the situation in each time slot, and sends pulse orders to the call service circuits 37 and 38, for calls originating either on a trunk or a line, respectively, when, and only when, these circuits are required to function. In addition the selector circuit 36 also receives pulse reports from the call service circuits 37 and 38 as they operate. This maintains privacy of the channel set up between the line or trunk being serviced and the selected call control circuit until each process has been completed.

The trunk call service circuit 37 scans the talking bus 22 to recognize a request for service from a trunk, and, when such a request is present, seizes the time slot of that particular trunk and blocks itself to information in other time slots. The dial pulses are received individually in the service circuit and are registered therein. In the specific embodiment described herein for simplicity of exposition of the principles of this invention it has been assumed that only a single digit is dialed to identify a given subscriber's line 20. This single digit is registered in the trunk call service circuit 37 and then inserted by the service circuit 37 into the circulating memory and specifically into the time slots in the memory channels which define the time slot of the calling trunk. In a full office where a number of digits, such as four, would be required to identify the line, the four digits comprising the subscriber's line directory number, these four digits would be registered in succession in a plurality of single digit registers, in the service circuit 37, the dial pulse signals being stepped successively from one register to the next during the interdigital time, and then each digit would be inserted into a group of memory channels in the memory circuit.

The line call service circuit 38 recognizes a request for service from a subscriber's phone 25. One of the unassigned trunk time slots is reserved for the scanning of lines and a line is scanned in this time slot during each office cycle. The frequency of scanning on any particular line thus depends on the number of lines; in the specific illustrative embodiment described herein wherein six lines are scanned each line will be scanned once every six office cycles. However, lines which are busy on prior calls are not scanned. If, in conducting the line scanning process, an off-hook signal is encountered, indicating that a subscriber is desiring service, the scanning time slot is seized by the line and held while dialing is in progress. The dialed number is set up in registers and compared to the codes of the trunks 27. When a match is found, the code of the calling line is inserted into the circulating line memory in the time slot of the called trunk so that the appropriate line and trunk gates are enabled to provide the desired communication path.

An erase circuit is provided to scan all the time slots and erase from the circulating memory the code appearing in any time slot in which there is not detected a pulse indicating that that particular time slot is being used. To prevent erroneous erasure, the erase circuit recognizes missing pulses in a time slot without causing immediate erasure. Instead, it seizes and scans the time slot either until the pulses reappear, indicating that a disconnect has not occurred, or until a sufficient period has elapsed for erasure to be in order.

Figure 28:
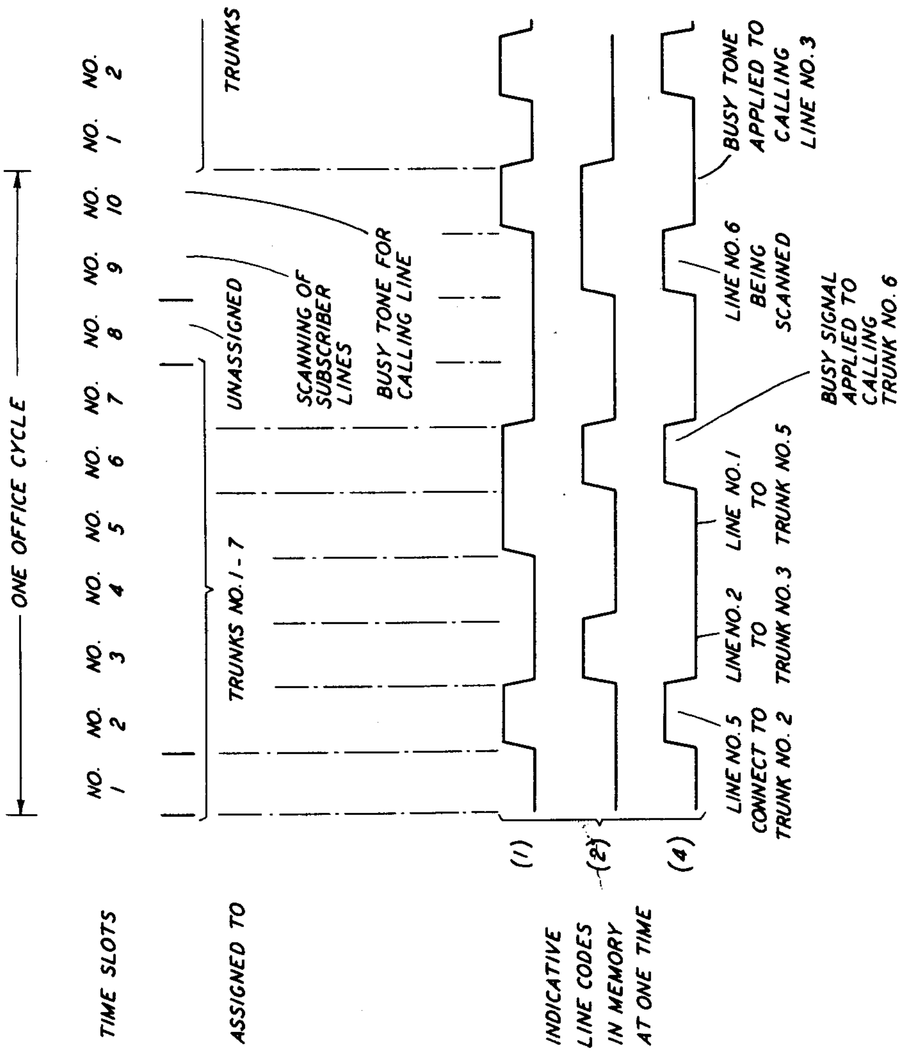
Fig. 28 is a time chart of one office cycle in the circulating memory indicating the trunks assigned particular time slots and the codes of subscribers' lines that may be circulating in the memory channels in these time slots at an arbitrarily chosen time.

The assignment of the ten time slots which comprise the office cycle in this specific embodiment of the invention to various functions is depicted pictorially in Fig. 28 which is a time chart of one office cycle in the circulating memory. As there seen and as discussed above, each of the first seven time slots is assigned to one of the seven trunks for the establishment of the talking path including that trunk. In this specific embodiment, time slot 3 is unassigned. The ninth time slot of the orifice cycle is utilized for the successive scanning of subscriber lines to detect off-hook conditions, as discussed above, and the tenth time slot of the office cycle is utilized for the insertion of a busy tone for a calling line which is attempting to reach a trunk occupied on a priorly set up call. In Fig. 28 there are depicted indicative line codes which may be circulating in the memory at one arbitrarily chosen time. As can be seen, these codes comprise pulses in each of the three memory channels which have been marked (1), (2) and (4) to indicate that the lines are identified by a binary code. As can readily be seen and as noted on the figure, the exemplary state of the memory that we have depicted is one in which trunk 1 is idle, trunk 2 is talking to subscriber line 5, trunk 3 is talking to subscriber line 2, trunk 4 is idle, trunk 5 is talking to subscriber line 1, trunk 6 has a call on it for a subscriber line occupied on one of the other calls and therefore has a busy signal applied to it as indicated by the busy code 4 in that time slot, and trunk 7 is idle. Line 6 at this instant is being scanned in the ninth time slot to determine if it is in an off-hook condition and therefore desiring to set up a call through the switching system, and line 3 has attempted to set up a call through the system to a trunk which is occupied on a prior call and therefore the code indication of line 3 has been inserted in the tenth time slot so that a busy tone is being applied to line 3.

Figs. 2 through 5 are a more detailed block diagram of the specific illustrative embodiment of this invention described herein and the invention and its operation will now be described with reference to that diagram and to the detailed circuit schematic of this specific embodiment of the invention depicted in Figs. 6 through 27.

Figure 29:
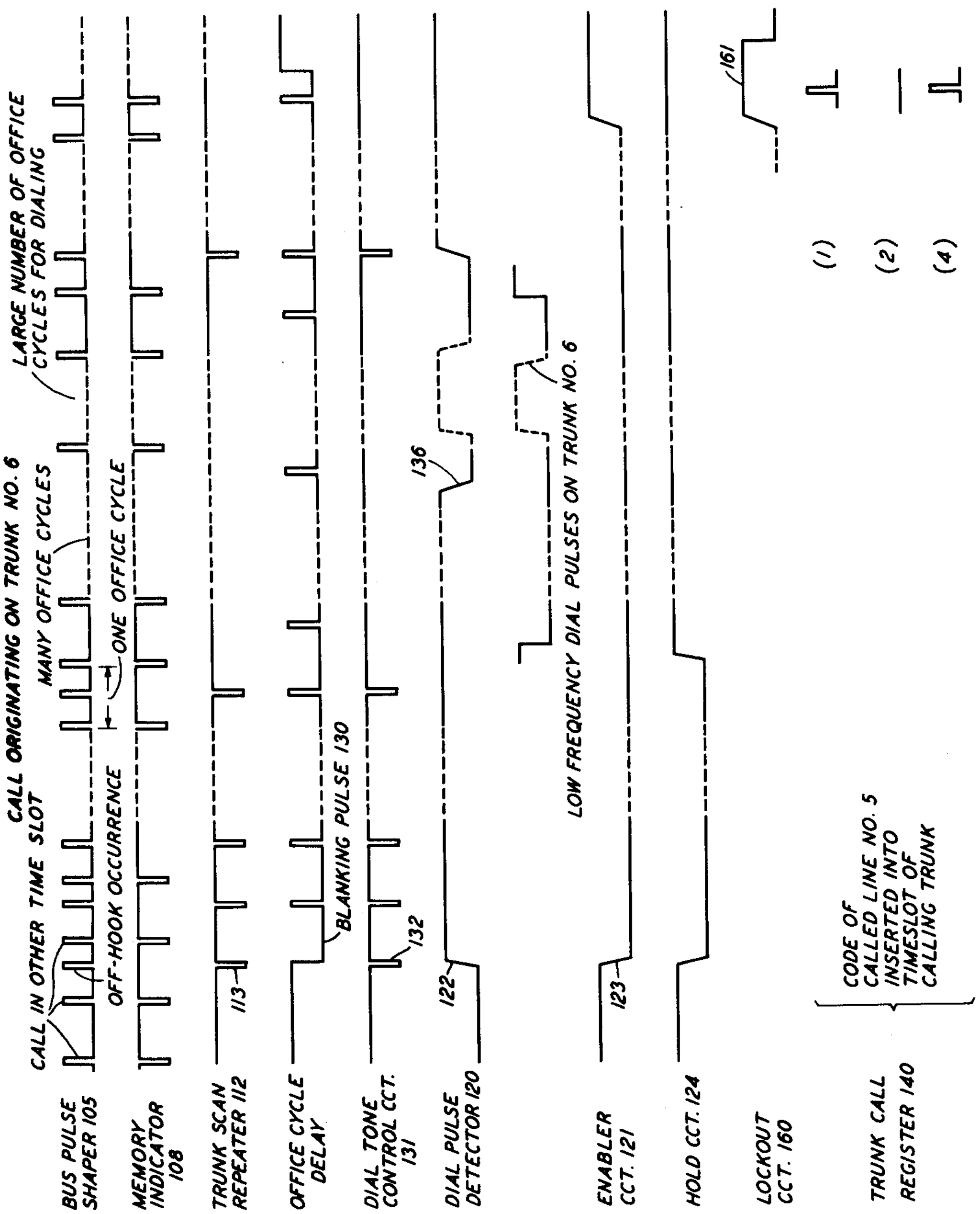
Fig. 29 is a time chart of the operation of various components in the establishment of a talking path for a call originating on a particular trunk.
Figure 30:
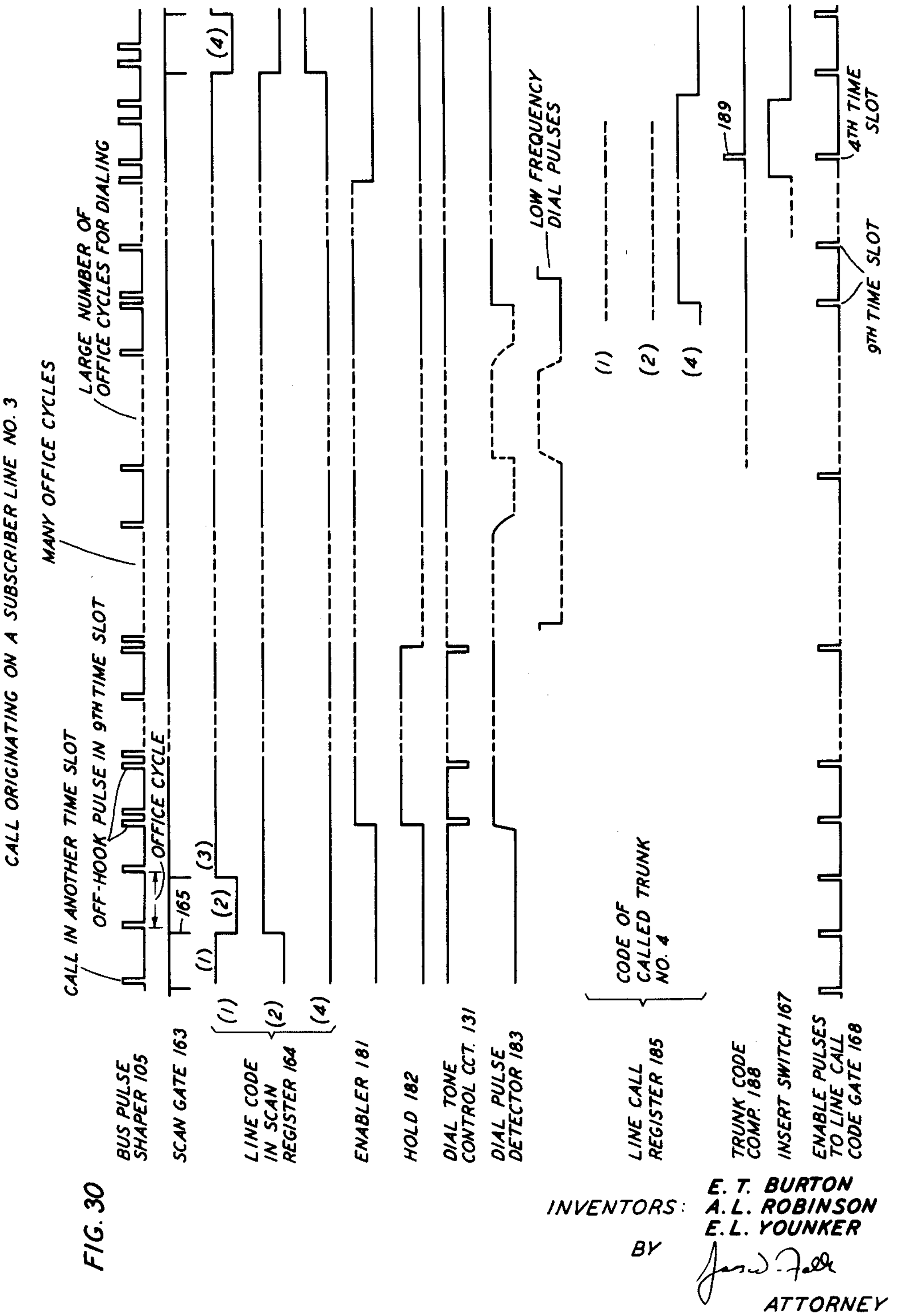
Fig. 30 is a time chart of the operation of various components in the establishment of a talking path for a call originating on a particular subscriber line.

Figs. 29 and 30 are time charts indicating the voltage conditions of certain of the components of this specific illustrative embodiment utilized in setting up a connection through the telephone exchange for a call originating on a particular trunk and for a call originating on a particular subscriber line. These figures can be referred to during the exposition of the circuitry involved to aid in appreciating the operation of that circuitry. They are thus intended for explanatory purposes and no attempt has been made accurately to depict actual voltage values or pulse shapes.

*Line and trunk circuits*

Figure 8:
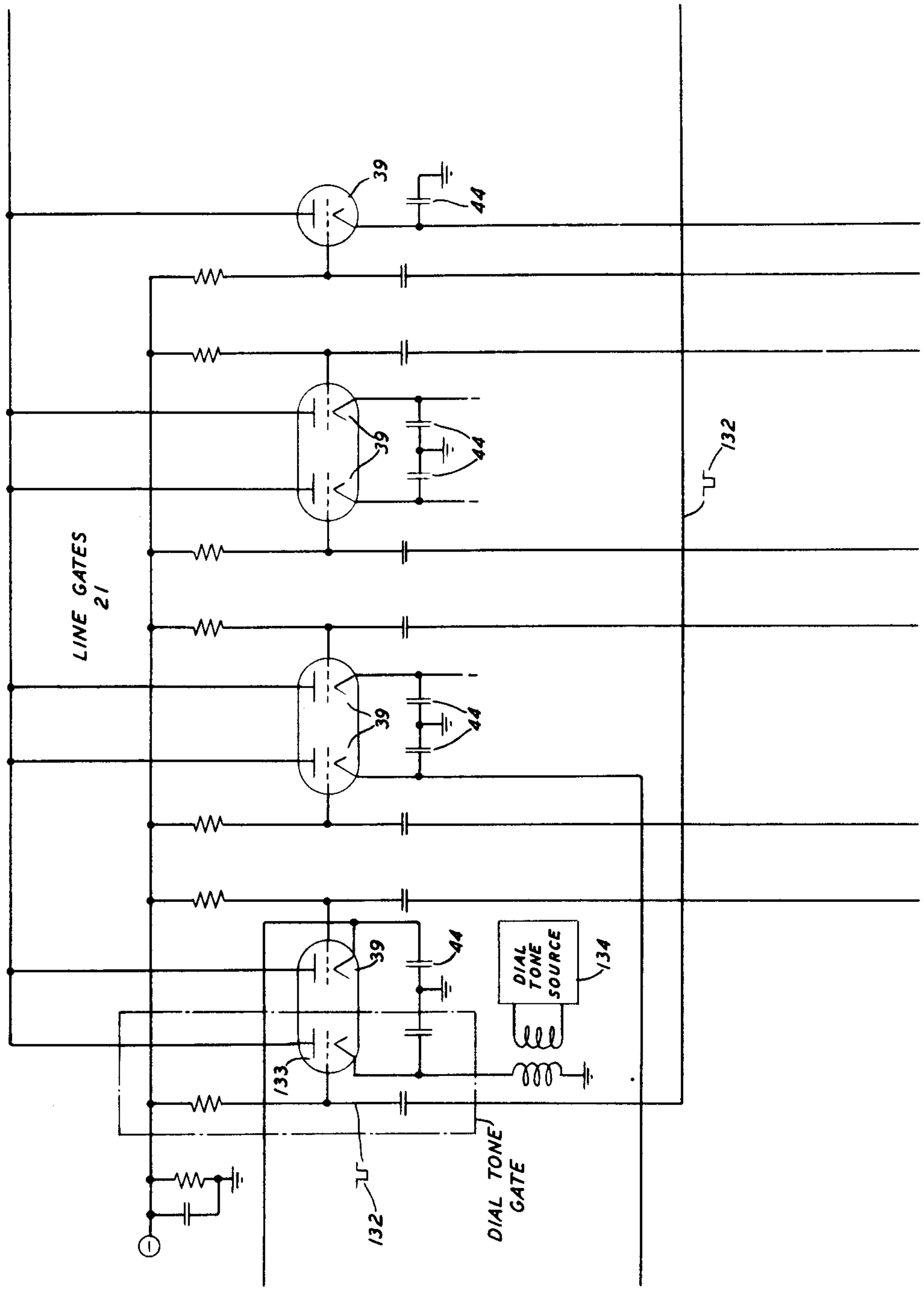
Figure 9:
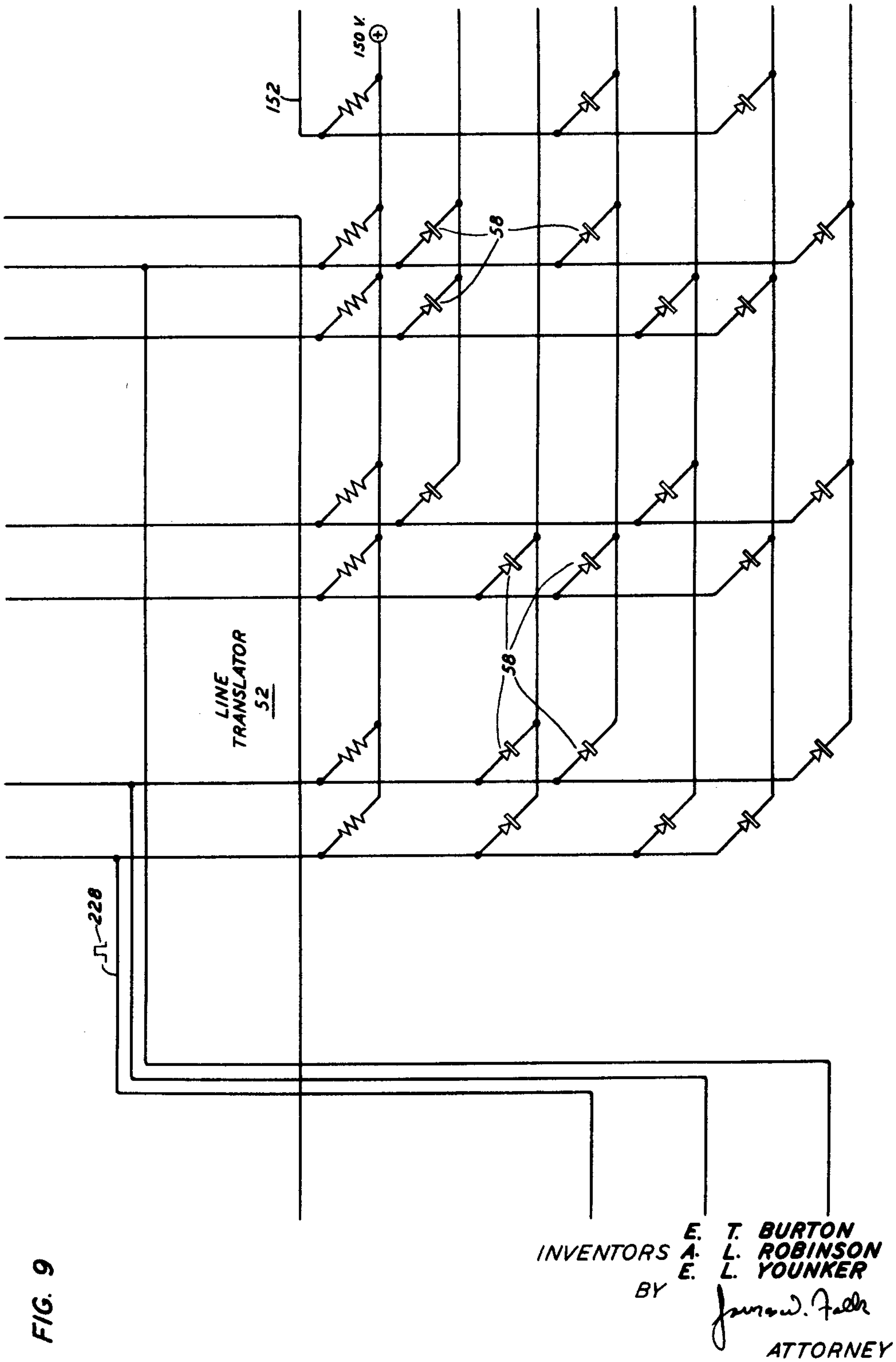
Figure 10:
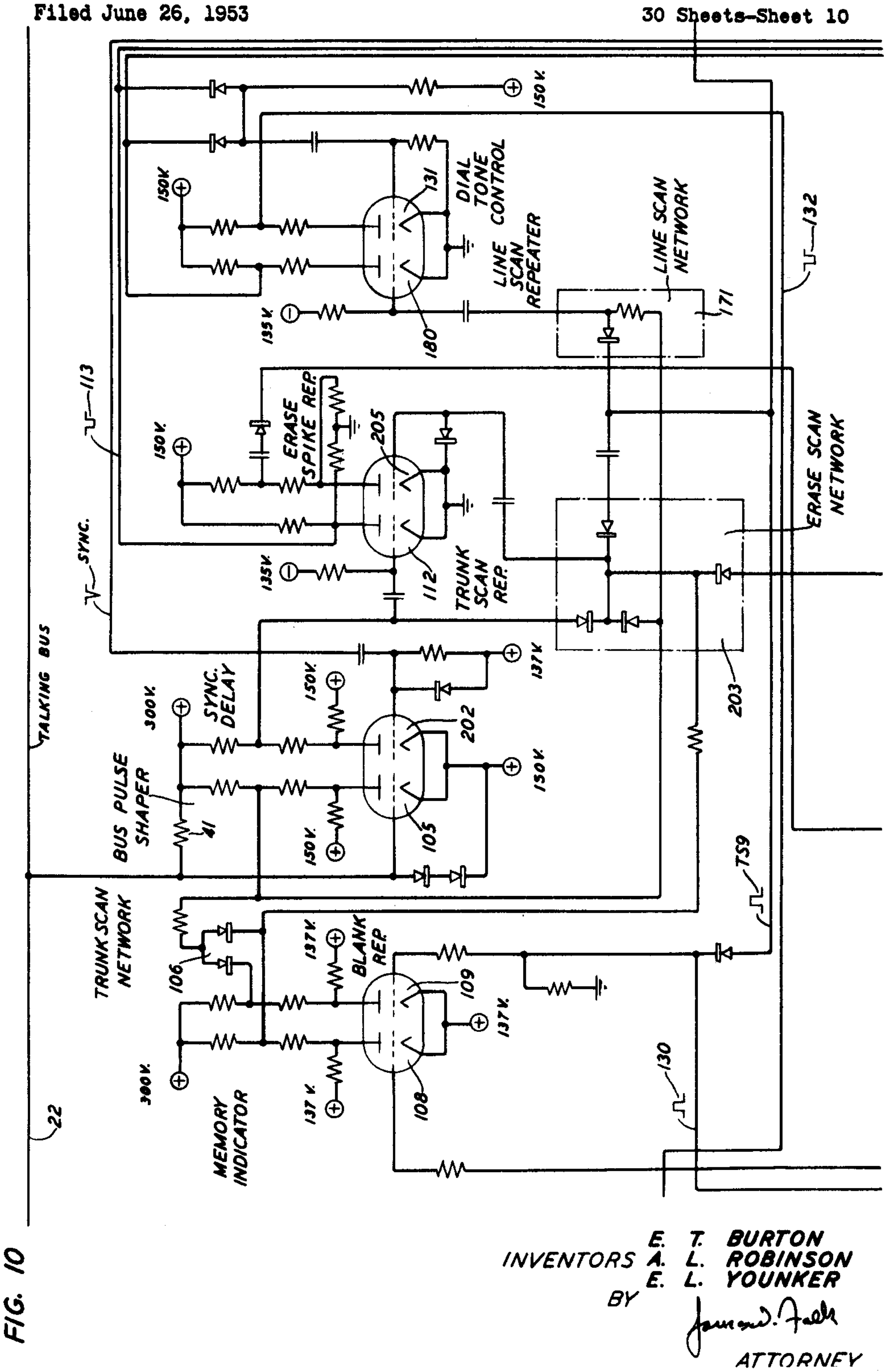
Figure 12:
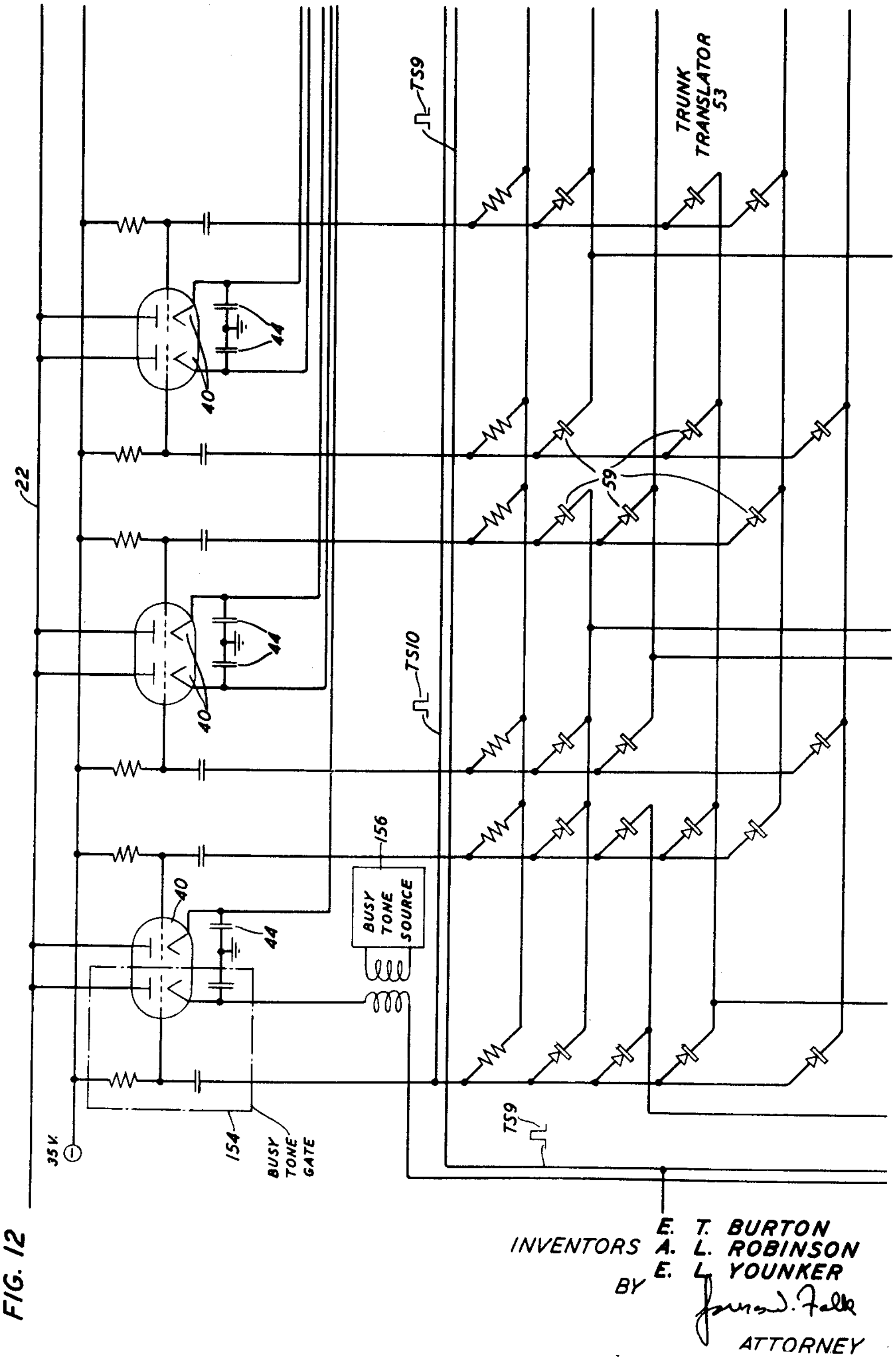

Each of the lines 20 and trunks 27 is connected to the single common talking bus 22 by the line and trunk gates 21 and 28 which advantageously may be triodes 39 and 40, respectively, the plates of which are connected to the talking bus 22 and thus to a suitable positive voltage supply through a single high resistance 41, seen in Fig. 10. Each cathode of the triodes 39 and 40 connects to a line 20 or trunk 27 through an audio transformer 43, not shown, for the trunks and a small capacitance 44 bridges from each cathode to ground. The grids of the gate triodes 39 and 40 are advantageously biased well beyond cut off, and in one specific embodiment a bias of −35 volts was applied through resistances 45 and 46 to the grids of triodes 39 and 40, respectively, as seen in Figs. 8 and 12. Thus the gates are normally disabled. The audio circuits of the lines connect the subsets 25 to a negative potential, which may advantageously be −27 volts, and the return to ground is made through a resistor 48.

The subscriber line circuits advantageously include amplifiers 24 interposed between a pair of hybrid coils 51 to amplify only signals coming from the line gates 21, as is known in the art. Amplifiers 54 advantageously are similarly disposed in the individual trunk circuits.

In the specific embodiment depicted in the drawing, the line and trunk connections to the gate cathodes stand at ground potential for the on-hook condition and at −13 volts for the off-hook condition, that being the potential drop across resistor 48. A limiting voltage is also advantageously applied to the cathodes of the gate triodes through a resistor 49 and diode 50. While not shown on the drawing the connections from the trunks to the cathodes of the trunk gate triodes 40 are the same as those disclosed for the line gate triodes 39.

Grid enabling pulses are applied to the gate triodes 39 and 40 from the line and trunk translators 52 and 53, as described further below. These enabling pulses are, in this specific embodiment of the invention, approximately +22 volts in amplitude. Therefore when a grid is pulsed and an on-hook conditions obtains, the grid-cathode potential is −13 volts and the triode remains cut off. For the off-hook condition the grid-cathode potential is in the neighborhood of zero and the conductivity of the triode is momentarily under control of the cathode potential and the plate potential. The former may be varied by signals from the connected line 20 or trunk 27 and the latter is varied by the simultaneous drain put upon the common plate resistor 41 by another gate activated in this time slot. The result of these controls is bilateral repeating of signal potentials.

Figure 2:
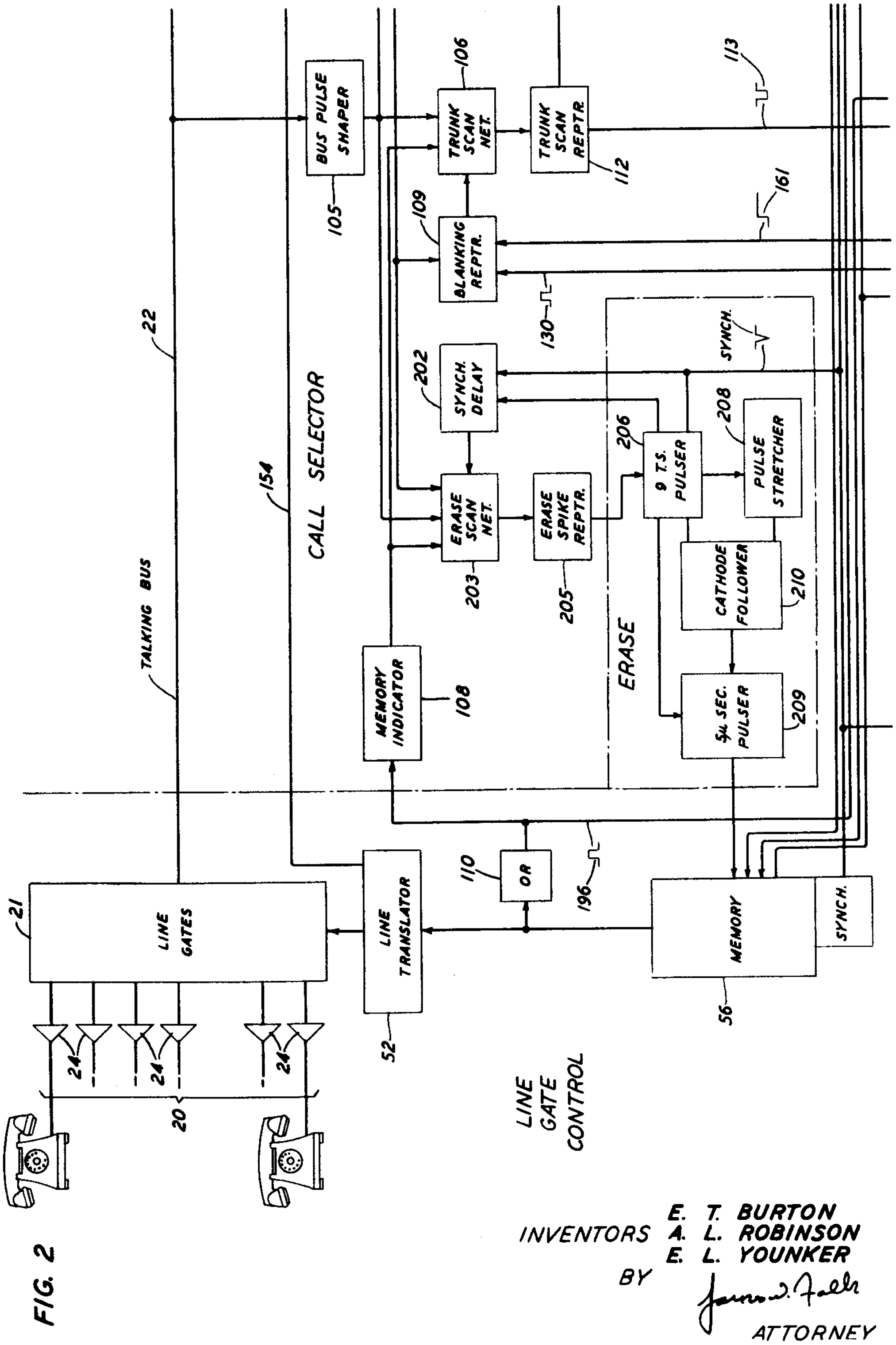
Figs. 2 through 5 are a more detailed block diagram representation of the specific illustrative embodiment of Fig. 1, the arrangement of Figs. 2 through 5 being shown in the key diagram of Fig. 31.
Figure 3:
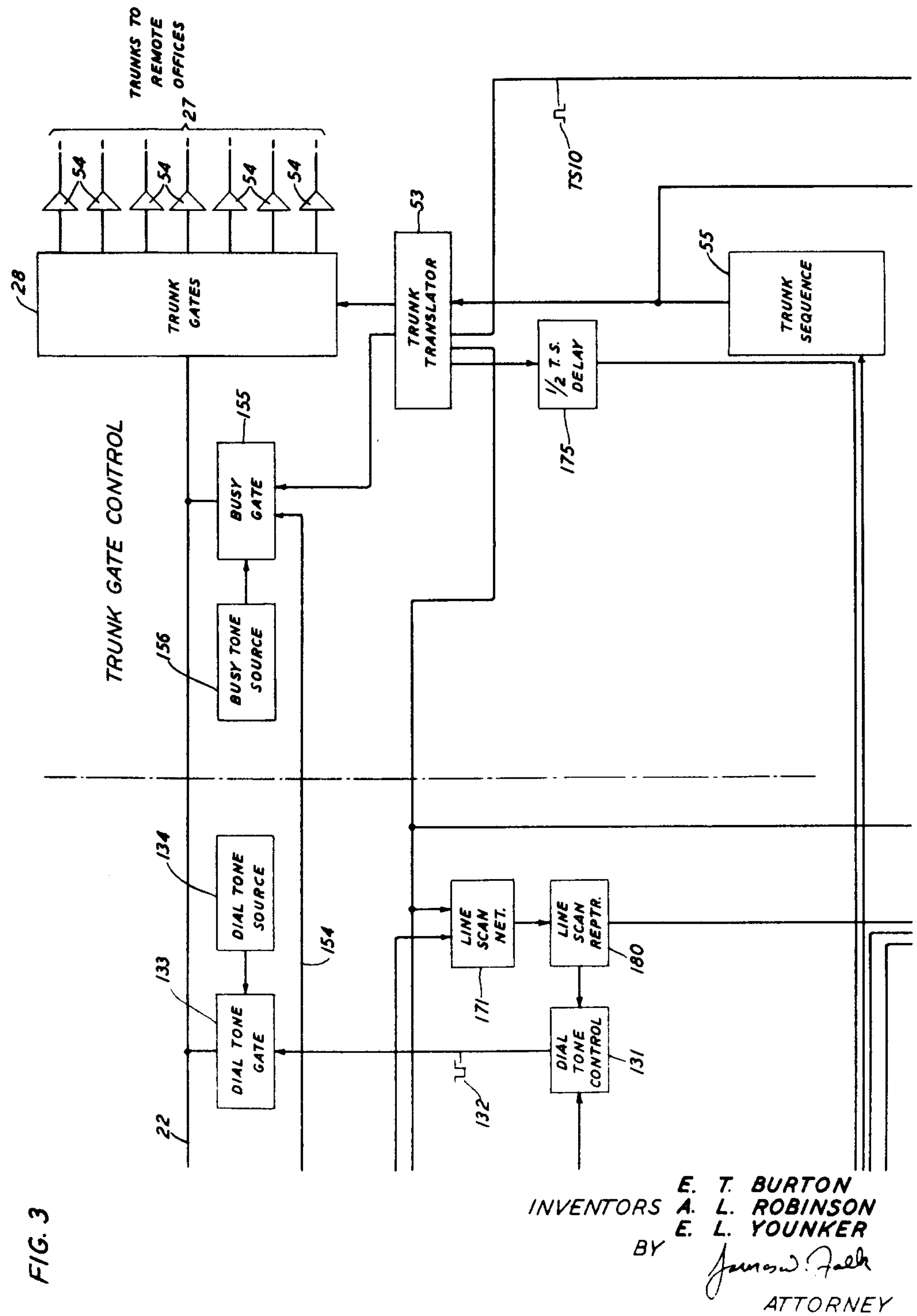
Figure 4:
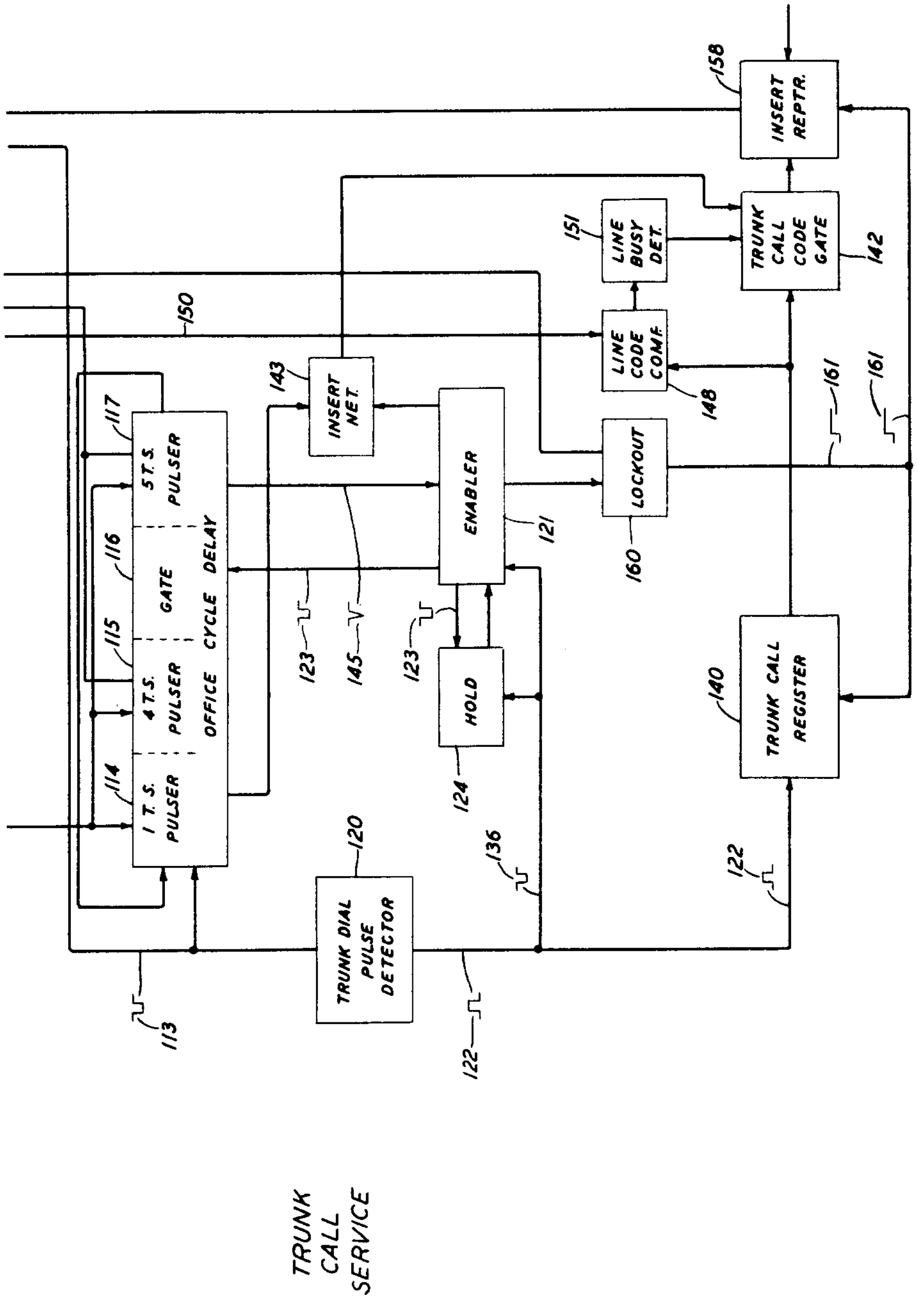

The trunk gate control circuit 30, depicted in Fig. 1, includes the trunk translator 53 and a trunk sequence circuit 55, both seen in Fig. 3 and schematically in Figs. 12 through 15, and similarly the line gate control circuit 32 includes a line translator 52 and a memory circuit 56, both seen in Fig. 2 and schematically in Figs. 9 and 16 through 19. Both the trunk sequence circuit 55 and the memory circuit 56, described in detail below, include binary flip-flop stages with both plates of each flip-flop connected into the associated translator.

The translators 52 and 53 are identical in principle of operation in this specific embodiment of the invention and each comprises a number of positive AND diode networks with inputs taken from the flip-flops of the associated trunk sequence circuit 55 or memory circuit 56. The line translator, best seen in Fig. 9, advantageously employs varistors 58 as the diodes elements of the AND networks, and the trunk translator seen in Figs. 12 and 14 advantageously employs varistors 59 as the diode elements of the AND networks. The AND network configurations are such that a positive voltage is applied to a given output from the translator only on the occurrence of a unique combination of input voltages. Therefore as the flip-flops of the trunk sequence and memory circuits present various voltage combinations in successive time slots, the talking gate triodes are successively enabled by positive biases applied to the grids of the triodes.

Figure 13:
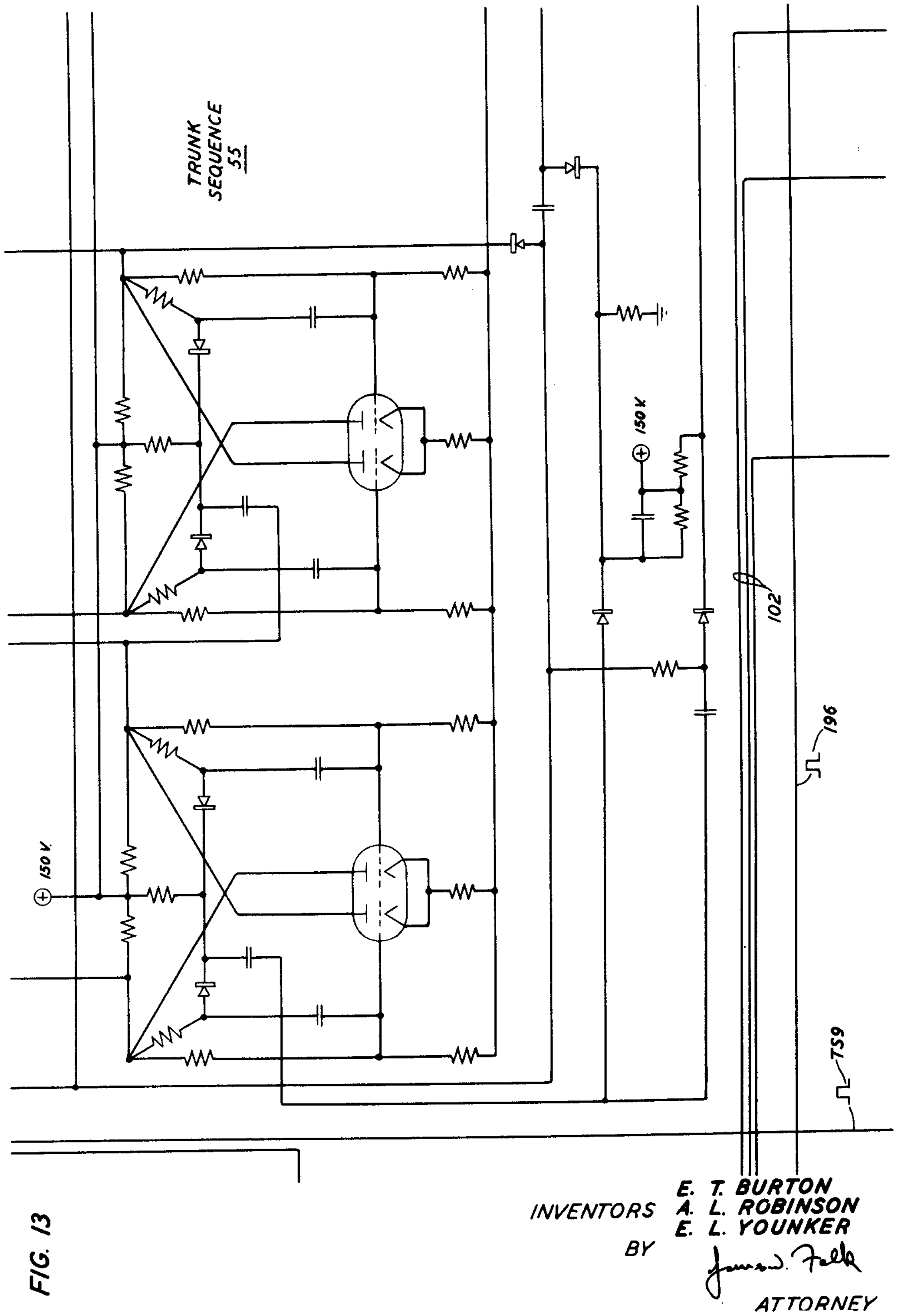
Figure 14:
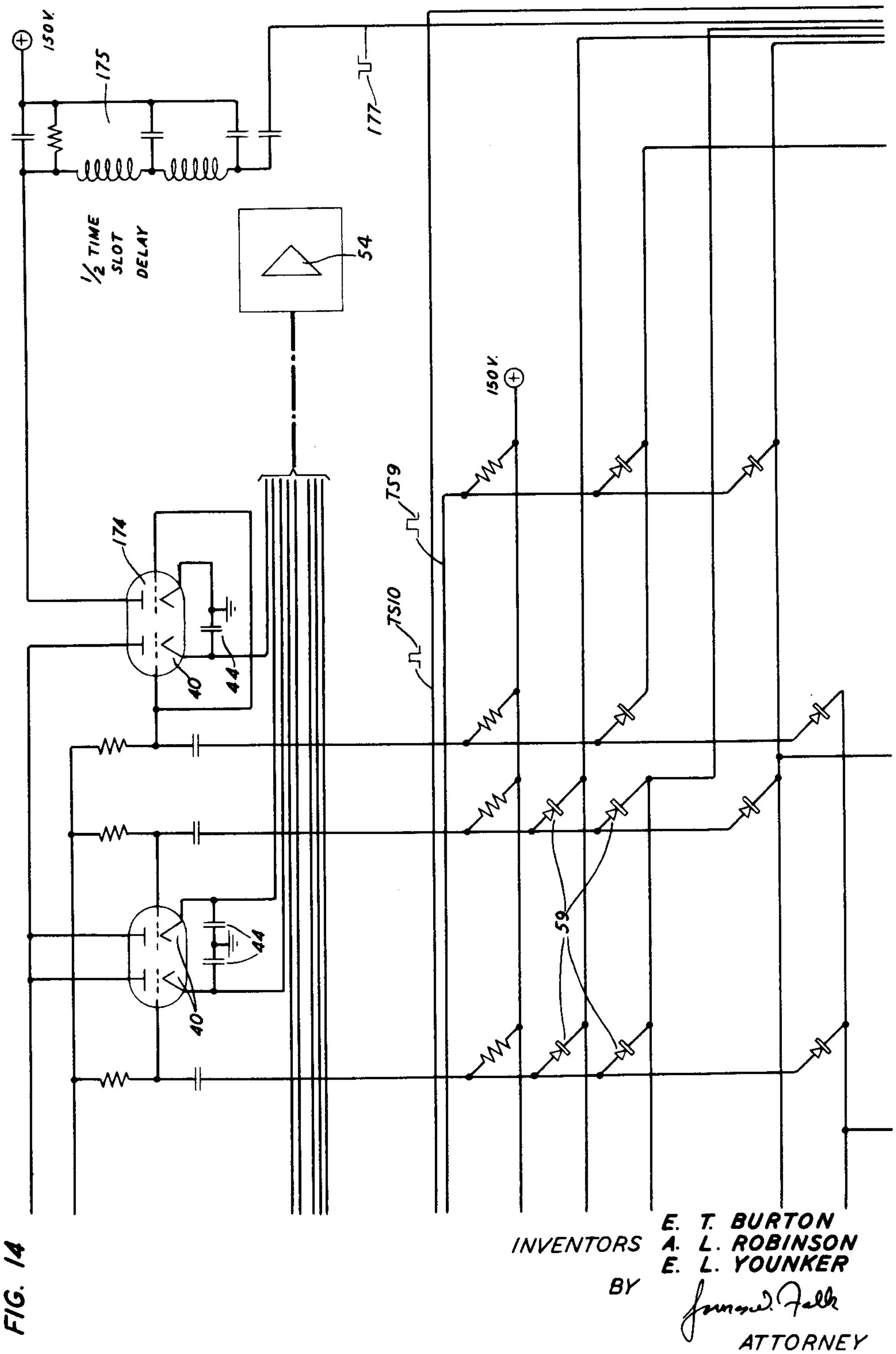
Figure 15:
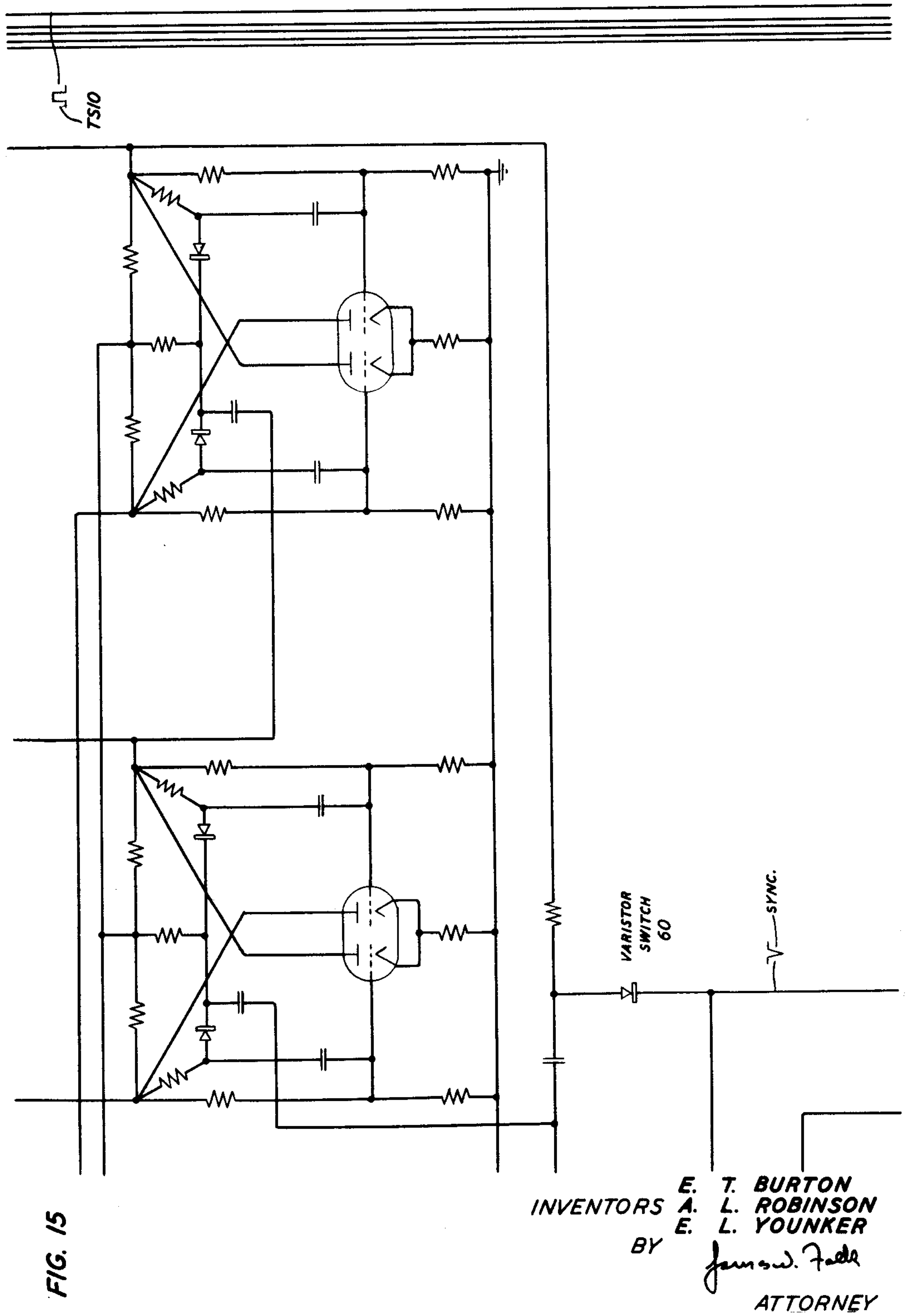

The trunk sequence circuit 55, seen best in Figs. 13 and 15, is advantageously a four-stage binary counter which is stepped synchronizing pulses derived from the master sync circuit 34, seen in Fig. 1 and described in detail below. Advantageously the trunk sequence circuit 55 is as described in Patent 2,828,071, issued March 25, 1958, of E. T. Burton, the circuit containing a varistor switch 60, seen in Fig. 8, which causes the counter to resent on each tenth pulse, thus counting tens. In a larger telephone exchange than the specific illustrative embodiment of this invention being described, more trunks would be employed and thus the office cycle would include a larger number of time slots than ten. In such a case, the trunk sequence circuit 53 would of course comprise a counter capable of counting to the number of time slots of the office cycle.

*Master synchronizer and memory circuits*

In this specific embodiment of the invention the master synchronizer circuit 34 and the system memory 56 advantageously utilize as a storage device a fused silica delay line of the type described in Patent 2,672,590, issued March 16, 1954 to H. J. McSkimin, though other types of delay lines may be employed.

This delay line consists of a block of fused silica onto which two quartz crystal transducers are soldered. The input crystal transforms electrical energy to acoustical energy and initiates an acoustical wave. After traveling through the block, the acoustical wave falls upon the output crystal where transformation to electrical energy takes place.

The functions of the memory are (1) to remember which lines and trunks are busy and which lines and trunks are idle, (2) to remember precisely the connections that exist between busy lines and trunks, and (3) to supply this information to the proper line and trunk circuits. The memory consists of a closed loop, into which pulses can be introduced, in which pulses can circulate for any desired length of time, and from which pulses can be selectively removed. The memory loop contains a reading point, through which the pulses pass once per round trip and from which information for the control of the line gates can be obtained.

The time of one round trip in the memory loop is an office cycle. The reciprocal of the office cycle is the speech sampling frequency, the rate at which connection between line and trunk is made. The sampling frequency must be at least twice the highest speech frequency which is to be transmitted without distortion. In the specific illustrative embodiment of this invention being described, a sampling rate of 16,000 c.p.s. corresponding to an office cycle of 62.5 seconds is used. Sixteen kc. is a higher rate than is required for speech sampling and in larger telephone exchanges in accordance with this invention a lower sampling frequency could be employed.

The function of the master synchronizer is apparent. In a time separation switching system, all speech and control circuits operate during short intervals of time and in order to obtain proper operation, all parts of the system must be accurately coordinated in time. This is done by actuating all circuits requiring accurate timing by synchronizing signals from a common source, the signals being depicted in the drawing as positive or negative sync pulses.

The frequency of the sync signals is determined by the number of intervals, or time slots, into which the office cycle is divided. The master synchronizer must supply one sync signal for each time slot; hence, the sync frequency is equal to the sampling frequency times the number of time slots per office cycle.

Figure 16:
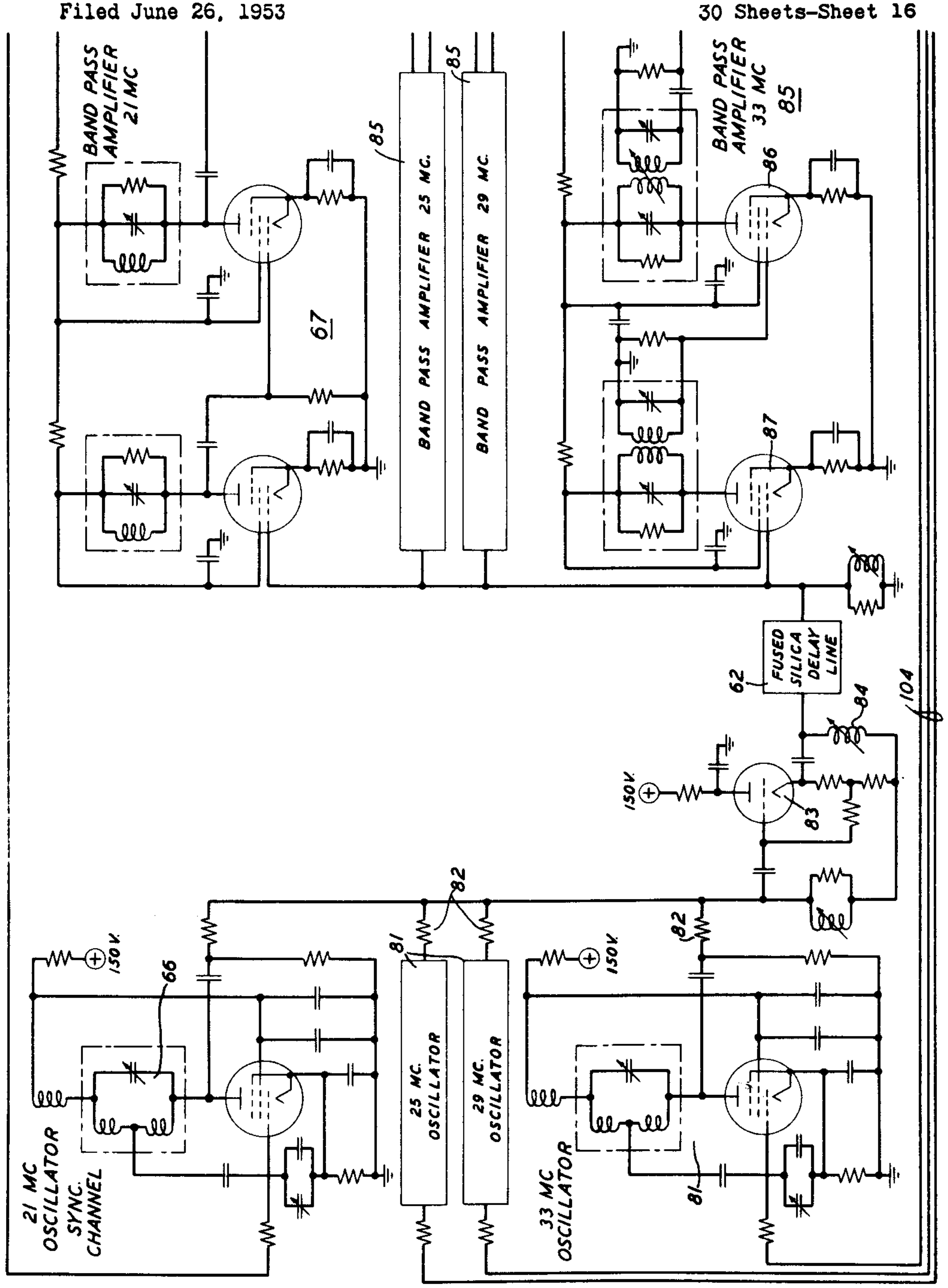
Figure 17:
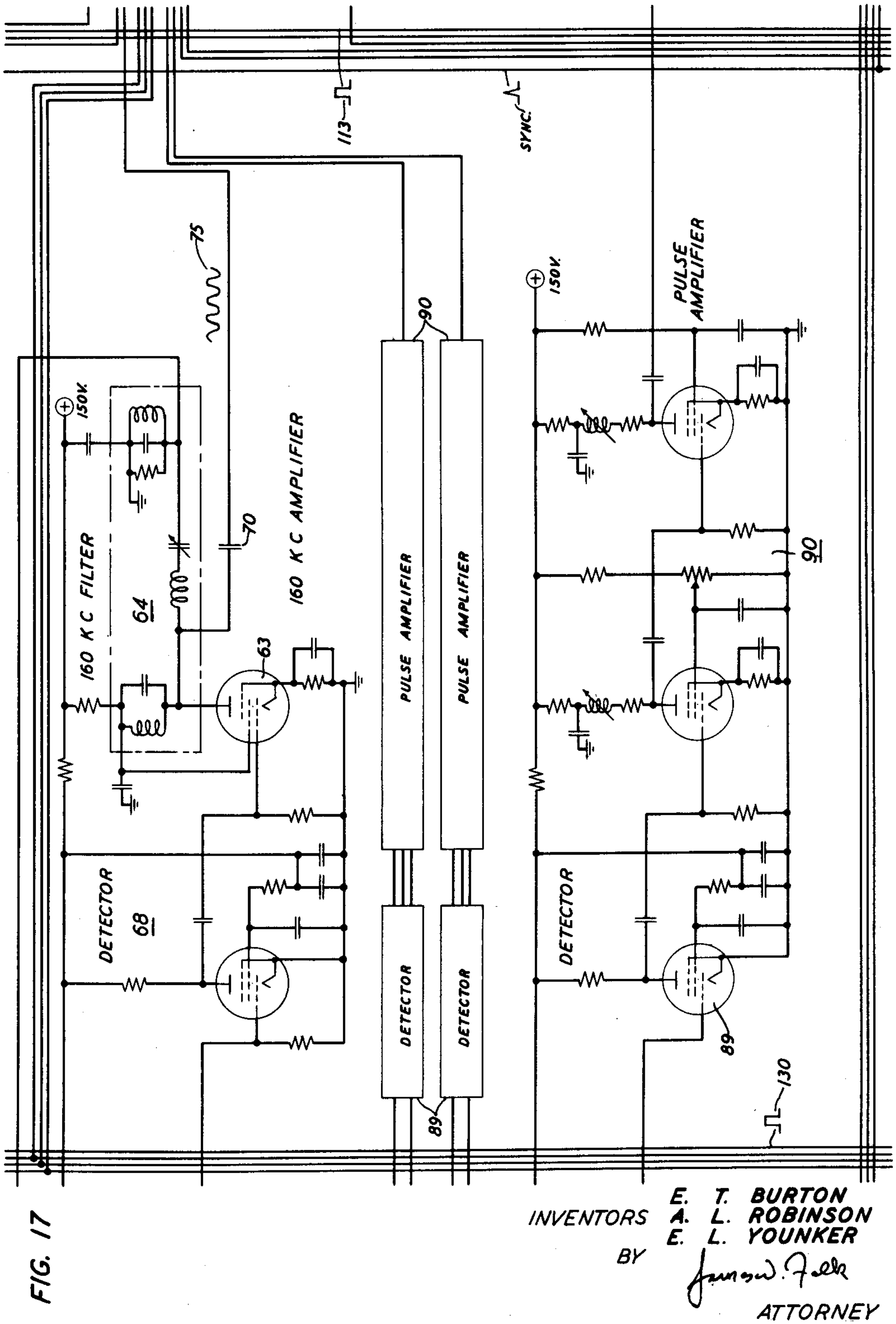

Turning now to Figs. 16, 17, 18 and 19, the basic elements of the synchronizing circuit 34 and the memory circuit 56 are there depicted. The fused silica delay line 62, seen in Fig. 16, is incorporated in the plate-grid feedback path of an amplifier 63, seen in Fig. 17, and the loop gain is adjusted so that the amplifier oscillates. The oscillator can be made to oscillate with a period roughly equal to the delay in the loop or at any harmonic of this frequency and the delay in the loop is advantageously chosen to be equal to the period of the office cycle. The desired harmonic, which in this embodiment is the tenth, is picked out by a band pass filter 64, the phase characteristic of which advantageously sets the exact frequency. In this specific embodiment the tenth harmonic is utilized as the office cycle and is divided into ten time slots, as described above. In the specific embodiment being described wherein the sampling frequency is 16 kc., the sync signal frequency is thus 160 kc.

In this embodiment a 21 mc. oscillator 66 is employed so that the 160 kc. sine wave is carried, as the envelope on an amplitude modulated 21 mc. carrier wave, through the fused silica delay line 62. A band pass amplifier 67 is added to make up at least partially for the loss of the delay line and a detector 68 is used to recover the 160 kc. envelope from the carrier wave. The 160 kc. sine wave is tapped off at the band pass filter 64 through a condenser 70 and is used to drive a synchronous pulse generator 71, seen in Fig. 19. The synchronous pulse generator itself consists of an over-driven amplifier 73 and a blocking oscillator 74. The large amplitude sine wave 75 from the filter 64 is applied to the grid of amplifier 73, whose output is shaped by an RC and varistor network 76 and is applied as a trigger to the blocking oscillator 74. The blocking oscillator output is taken across resistors 78 and 79 in the cathode and plate circuits, respectively. In this specific illustrative embodiment of this invention the positive and negative sync pulses thus are obtained from low impedance sources having a rise time of less than .2 microsecond and an amplitude of 35 volts.

The memory circuit 56, of Fig. 2, is quite similar to the master synchronizer circuit 34 just described in that a modulated carrier is transmitted through the fused silica delay line 62, amplified, and detected. It is different from the synchronizer in that the 160 kc. band pass filter 64 is replaced by a memory control circuit which takes the degraded pulse from the delay line and creates a new one. The memory pulses must always stay in step with the master synchronizer and so memory pulses reinserted into the delay line are advantageously controlled both by the sync signals and by the delayed pulse. In this memory control circuit, when both a sync signal and a delayed pulse arrive simultaneously, a new regenerated memory pulse is started. The beginning and ending of this pulse are determined by the sync signals and not by the delayed pulse, so there is no cumulative effect of imperfections in the memory circuit. The memory control circuit also ties the memory to the rest of the system. It is the part of the loop where new information is introduced into memory, where information is removed from memory, and from which information for the control of line and trunk circuits is obtained.

In the specific illustrative embodiment of this invention depicted and described herein, it has been assumed, as discussed above, that only seven different subscribers' lines 20 utilize this telephone exchange and therefore only three binary digits are required to identify these lines. Therefore the specific illustrative embodiment of the memory circuit 34 illustrated at Figs. 16, 17 and 18 employs only three memory channels; but it is to be understood that this invention is being described with but three memory channels solely to simplify the description and the drawing and that considerably more memory channels would be employed in larger telephone exchanges. In a full 10,000 line exchange fourteen memory channels would be employed together with the one channel for the master synchronizing circuit. These channels could readily be accommodated by three fused silica delay lines, which should be initially coordinated and then maintained at the same temperature. In such a larger embodiment of this invention, a slightly more complicated line translator 52 would be employed.

In the drawing, the components of one memory channel, identified as channel 1, are depicted in detail; the components for the other memory channels of which in this embodiment of the invention there are two, identified as channel 2 and channel 4, are identical to those of channel 1 but different carrier frequencies are employed. The carrier frequency is generated by an oscillator 81, which is advantageously a sharp cut-off pentode used in class B operation and thus having the desirable characteristics of good frequency stability and ease of grid or cathode modulation. The carrier oscillators 81 are isolated by resistance pads 82 of approximately 16 decibel loss and are combined in a cathode follower 83, which provides a low impedance source to the delay line. The input capacitance of the delay line 62 is advantageously tuned out by an inductance 84. Band pass amplifiers 85 compensate for the loss in the delay line, the amplifiers advantageously comprising two pentodes 86 and 87 with double tuned interstage coupling. The pulse train envelope of the carrier frequency is detected by a detector 89. The pulses are amplified in the pulse amplifier 90 and are then applied to the memory control circuits 92, seen in Fig. 18.

Each memory control circuit 92 is advantageously a pulse regeneration circuit comprising two dual triodes, having triode sections 94, 95, 96 and 97, and a dual negative AND network 99. Triode sections 96 and 97 are used in a bi-stable flip-flop circuit and provide the regenerated output to leads 102 and thence to the line translator 52 and also, through cathode followers 103, to leads 104 and thence to the inputs of the oscillators 81. Triode sections 94 and 95 enable the AND network 99 to conduct the negative sync pulses, from the sync pulse generator 71, to the grid of triode section 96 or 97 as required by the presence or the absence of an input signal, from the detector 89 and pulse amplifier 90, at the grid of triode section 94. In the absence of an input signal, triode section 95 conducts because of the fixed bias on its grid; its plate is therefore negative with respect to the supply voltage and the negative sync pulses go to the grid of triode section 97, holding triode section 97 cut off. Successive pulses of the same polarity result in no change in the state of triode section 97. When a positive detected pulse from the delay line reaches the grid of triode section 94, the grid goes more positive, the cathode follows, and as a result, triode section 95 is cut off and triode section 94 conducts. Due to the fact that the plate of triode section 94 is now negative with respect to the supply voltage, succeeding sync signals go to the grid of triode section 96; the first sync pulse to pass causes triode section 96 to cut off and causes the plate of triode section 96 to take a positive step. Thus the presence of a delayed pulse at triode section 94 gives rise to a re-shaped, accurately-timed, positive pulse at triode section 96. In order that a reliable coincidence of sync and delayed pulses take place in the AND network 99, the delay of the fused silica line is advantageously made one half time slot less than an office cycle; thus, the sync pulse comes at the middle of a delayed pulse and the regeneration process occupies the remaining fraction of a time slot thus completing precisely the time allotted to one office cycle. It is apparent in the foregoing description of the regeneration process that, where two or more consecutive time slots are occupied by signals of the same polarity, no change occurs in the state of the regenerator output. This is advantageous in that the lowest possible frequency of response of the regenerator, consistent with complete identification of the signals, is attained.

The insertion of new pulses into the circulating memory and the erasure of pulses from memory are accomplished by applying negative signals to the grids of triode sections 96 and 97. Suppose that there is no information in memory and that we wish to insert a pulse, such as insert pulses 1, 2, or 4 from the insert repeater circuit seen on Fig. 23 and described below. As explained above, with no input to triode section 94, the sync signals will go to triode section 97 and triode section 96 will be conducting. The negative insert signal is applied to the grid of triode section 96 immediately following the sync signal which marks the beginning of the time slot into which we wish to insert. Triode section 96 is cut off by the insert signal and stays cut off until the next sync signal restores conduction. Thus a positive pulse, slightly less than one time slot long appears at the plate of triode section 97. After passing through the delay line and being detected, this pulse arrives at triode section 94 and is regenerated; and so a circulating pulse is initiated.

Pulses in memory are erased in a similar manner. With the arrival of the pulse at triode section 94, the negative sync signal is directed to triode section 96, and a positive pulse at the plate of triode section 96 is started. Immediately following the sync signal, a negative erase signal from the erase circuit is applied to the grid of triode section 97 and the conduction is restored to triode section 96. In this way, the positive pulse at the triode section 96 plate is cut short and after a trip through the delay line, it arrives at triode section 94 with insufficient amplitude and pulse width to permit regeneration.

*Call originating on trunks*

Having thus described the control circuits for connecting any particular trunk and any particular line to the common talking bus 22, let us now consider the operation of the specific illustrative embodiment of this invention in setting up a connection between any of the trunks and lines. A connection may be set up on request either of a subscriber in a distant office, the request appearing on one of the trunks, or on request of a subscriber in this office, the request appearing on one of the lines. Both requests will be referred to as off-hook conditions.

Considering first the setting up of a connection on request of a subscriber in a distant office, the off-hook condition appears as a negative signal on the common bus 22 in the time slot of the particular trunk requesting the connection. This signal is applied to a triode pulse shaper circuit 105. The resulting positive output pulse is applied to a positive AND circuit 106 identified as the trunk scan network, the circuits being best seen in Fig. 2 in the block diagram schematic and in Fig. 10 of the detailed circuit schematic. The description of the setting up of connections may readily be understood with reference to the block diagram of Figs. 2 through 5, reference being made to Figs. 6 through 27 for detailed depiction of specific illustrative embodiments of the various circuit elements described. The bus pulse shaper 105 generates a positive output pulse in each time slot where an "off-hook" condition exists. This stage clips the pulses so that they are of substantially constant amplitude.

The trunk scan network is enabled only on the presence of a pulse from the bus pulse shaper 105 and the absence of pulses from a memory indicator circuit 108 and a blanking repeater circuit 109. The memory indicator circuit 108 transmits pulses from a positive OR circuit 110. A pulse appears at the output of OR circuit 110 whenever a code is applied, from the memory control channels 92 of the memory circuit 56, to the line translator 52. OR circuit 110 is thus enabled whenever a line is connected to the talking bus 22 through a line gate 21. Under these conditions, the presence of a negative signal on the common talking bus 22 is not a trunk "off-hook" signal and the trunk scan network 106 is, therefore, not enabled. The blanking repeater 109 similarly disables the trunk scan network 106 whenever the control circuits 37 for calls from a trunk, seen in block form in Fig. 1, have been seized by a prior call, as further described below. For the moment we will not consider these time slots that are assigned to special functions and not assigned to outgoing trunks.

Figure 20:
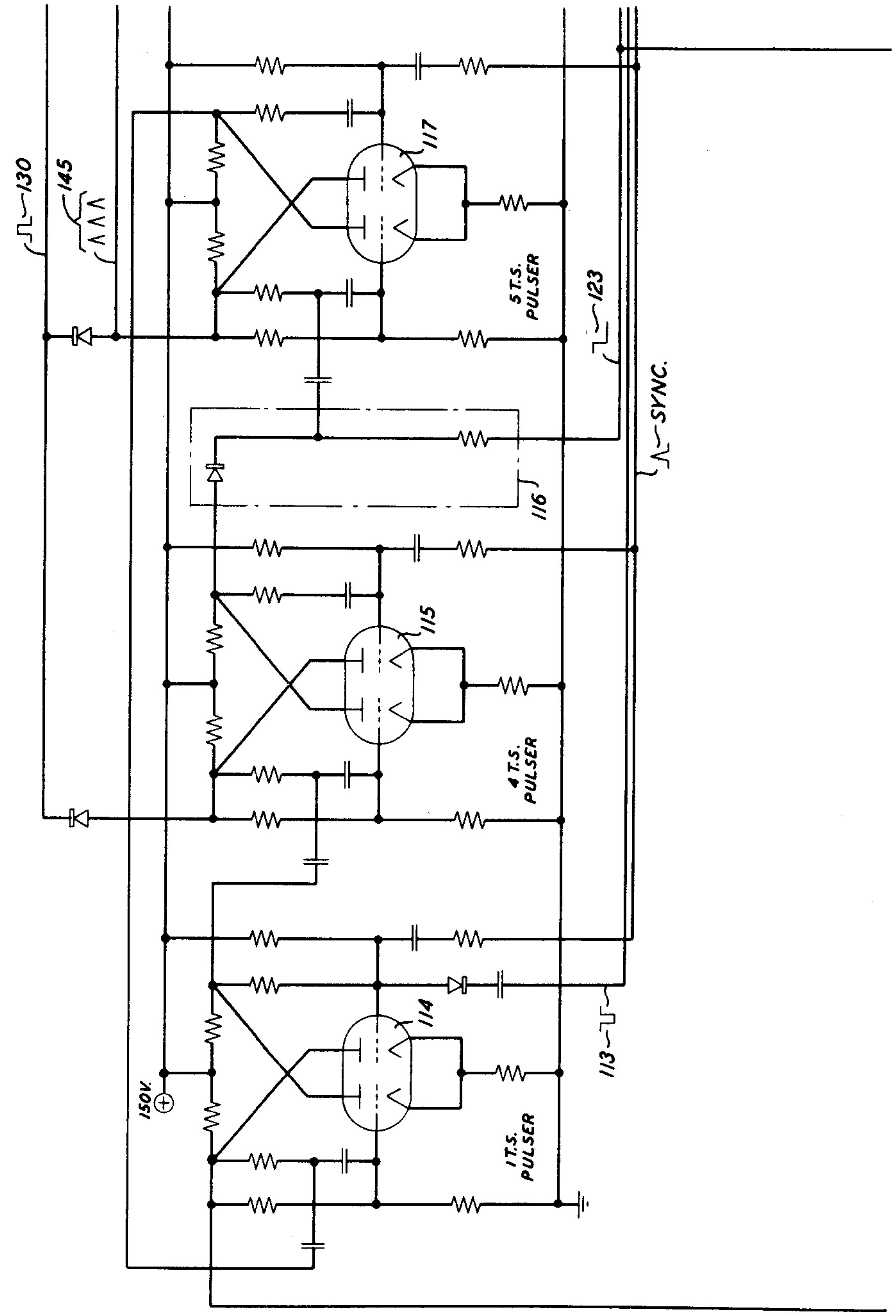

The trunk scan network 106 enables a trunk scan repeater 112, which may advantageously include a triode, as seen in Fig. 10, and which repeats the trunk-scan pulse 113 to an office cycle delay circuit. This delay circuit, as seen in Fig. 20, may advantageously comprise a one time slot pulser 114, a four time slot pulser 115, a gate 116, and a five time slot pulser 117. Each of the pulser circuits 114, 115, and 117 may advantageously comprise a twin triode with the triode sections in flip-flop arrangement. Pulse 113 from the trunk scan repeater 112 is applied to the right-hand section of the twin triode of the one time slot pulser 114 and, as the office cycle delay circuit is a ring circuit, the pulse will be continuously circulated therein with a period of ten time slots.

Figure 22:
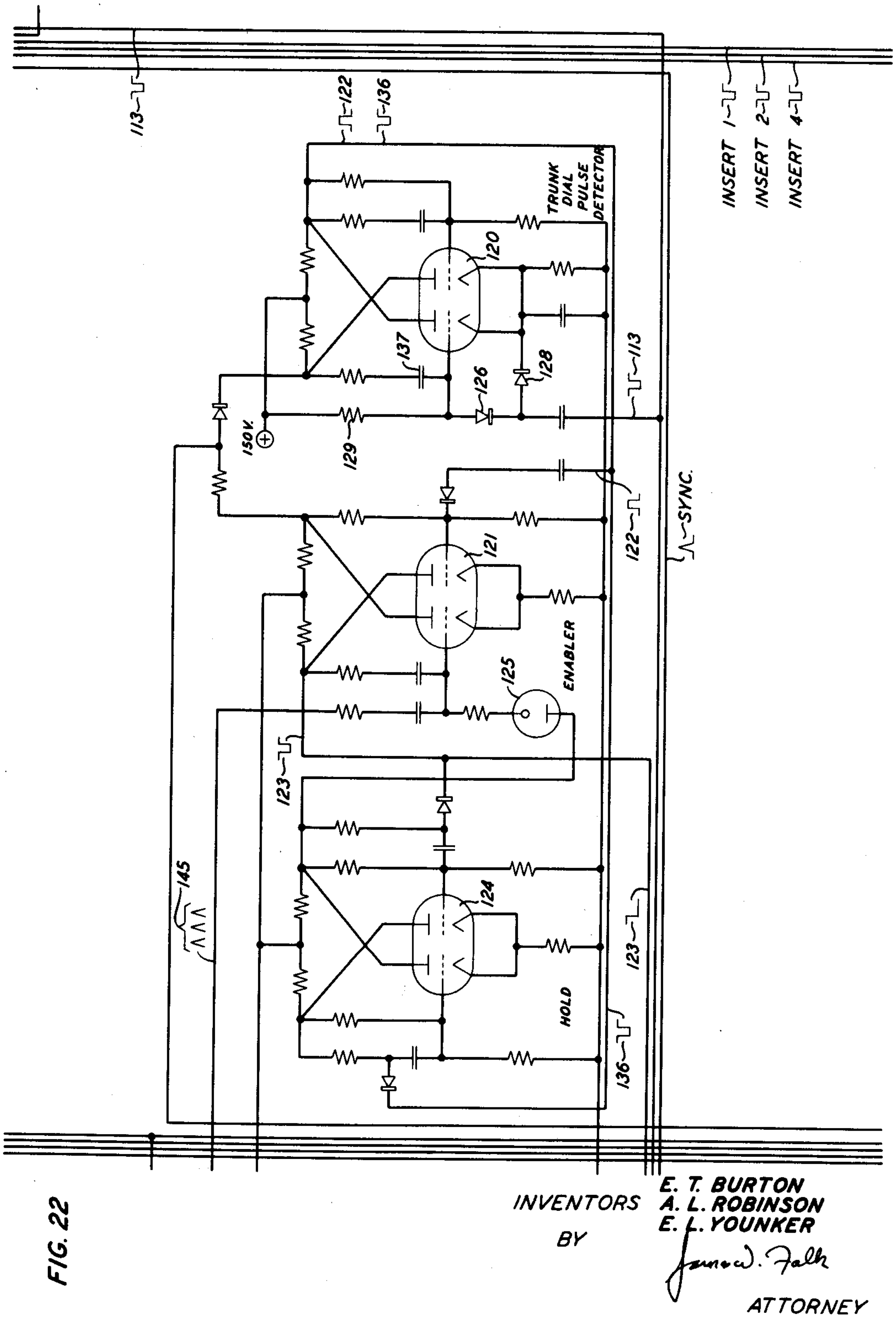

The trunk scan pulse 113 is also applied to a dial pulse detector circuit 120, which, as seen in Fig. 22, may also comprise a twin triode in flip-flop arrangement; pulse 113 is applied to the grid of the left-hand triode section. The detector circuit 120 includes a pair of rectifiers or diodes 126 and 128, a high resistance 129 connected between the grid of the input stage and a positive voltage source, and a capacitor 137, further described below. The employment of these rectifiers enables a very rapid response to the applied signal by the detector and a substantially square-wave output during the period that signals are applied once per office cycle. This combination of elements is utilized in a number of detector circuits in this specific embodiment of the invention but will not be specifically referred to again. The detector circuit 120 operates an enabler circuit 121 by generating a positive pulse 122 which is applied to right-hand triode section of the twin triode comprising the enabler circuit. When the enabler circuit 121 is triggered, a negative pulse 123 is applied to the grid of the right-hand section of a twin triode in a hold circuit 124. The hold circuit 124 in turn applies a holding negative bias through a gas tube 125 to the grid of the left-hand section of the enabler circuit twin triode so that the enabler circuit remains operated. Operation of the enabler circuit applies the negative voltage 123 also to the gate 116 of the one office cycle delay circuit and opens that gate, enabling pulses to circulate in that closed ring circuit. Positive sync pulses are applied to each pulser of the ring circuit so that it runs in step with the other equipments of the exchange.

When the one office cycle ring or delay circuit has a pulse circulating in it, the one time slot pulser 114 will operate once per office cycle, marking the time slot in which the circuit initially responded. When the four and five time slot pulsers 115 and 117 are operated, they supply a blanking pulse 130 to the blanking repeater 109, disabling the trunk scan network 106 during the time slots other than that which has been thus seized or marked. The trunk scan repeater 112 can thus only repeat pulses from the seized time slot and, therefore, only from the trunk 27 assigned to that time slot.

Operation of the trunk scan repeater 112 also pulses the dial tone control circuit 131, seen in Fig. 10, which causes a negative pulse 132 to be applied to the dial tone gate 133, seen in Fig. 8. This gate may also advantageously be a triode and conduction through the triode applies a dial tone, from a dial tone source 134, to the common talking bus 22 in the time slot of the trunk requesting service. So long as the off-hook condition appears during each time slot of the seized trunk in subsequent office cycles, the circuit will remain in this condition with the dial tone applied to the common talking bus 22 only during this time slot. While dial tone is referred to herein as being applied to the common bus both when a trunk is requesting a connection through an exchange in accordance with this invention, as just described, and when a line is requesting such a connection, described below, it is to be understood that the tone transmitted over a trunk to a distant office is a signal to equipment in that office to commence transmitting the dial pulses and is not the dial tone actually applied to the line of the subscriber in that distant office.

The dial pulses are now transmitted over the trunk from the distant office. As discussed above, to facilitate the understanding of this invention and the principles and features thereof, it has been assumed that only six subscriber lines 20 are connected into the telephone exchange in accordance with this invention. Therefore, only a single digit is required to identify a particular line 20. In the particular embodiment of this invention depicted, the dial pulses are detected by the trunk scan network 106, after shaping by the bus pulse shaper 105, and repeated, by the trunk scan repeater, to the trunk dial pulse detector 120 in the same manner as described above for off-hook signals. At the start of the first dial pulse, the hold circuit 124 restores, as the off-hook signals are interrupted by the dial pulses and thus in place of the positive voltage 122 a negative pulse 136 is applied to the hold circuit and specifically to the grid of the left-hand triode section thereof. Restoration of the hold circuit 124 removes its restraint on the enabler circuit 121 which tends to restore itself. However, the restoring of the enabler circuit is delayed, due to a capacitance 137 which is advantageously sufficiently large that the time constant of the RC circuit of which it is a part is longer than the time required for the dialing of pulses for a digit nine. The train of dial pulses from the dial pulse detector steps the trunk call register 140, seen in Fig. 23, and the called number is registered in binary form. For a full line office, such as a 10,000 line office, four registers would be utilized, the registers being the same as register 140 but each employing four registering discharge devices instead of just the three depicted in the drawing. Thus, a register circuit would be provided for each digit of the subscriber's directory number and a relay tree would advantageously be utilized to transfer the pulses from one register to the next during the interdigital time interval, as is known in the art. Advantageously the relay tree would also provide contacts such that pulse 136 could only be applied to the hold circuit when the fourth or last register 140 has been seized, so that the enabler circuit 121 would only be restored on the completion of the last train of pulses designating the called subscriber's line directory number.

Figure 21:
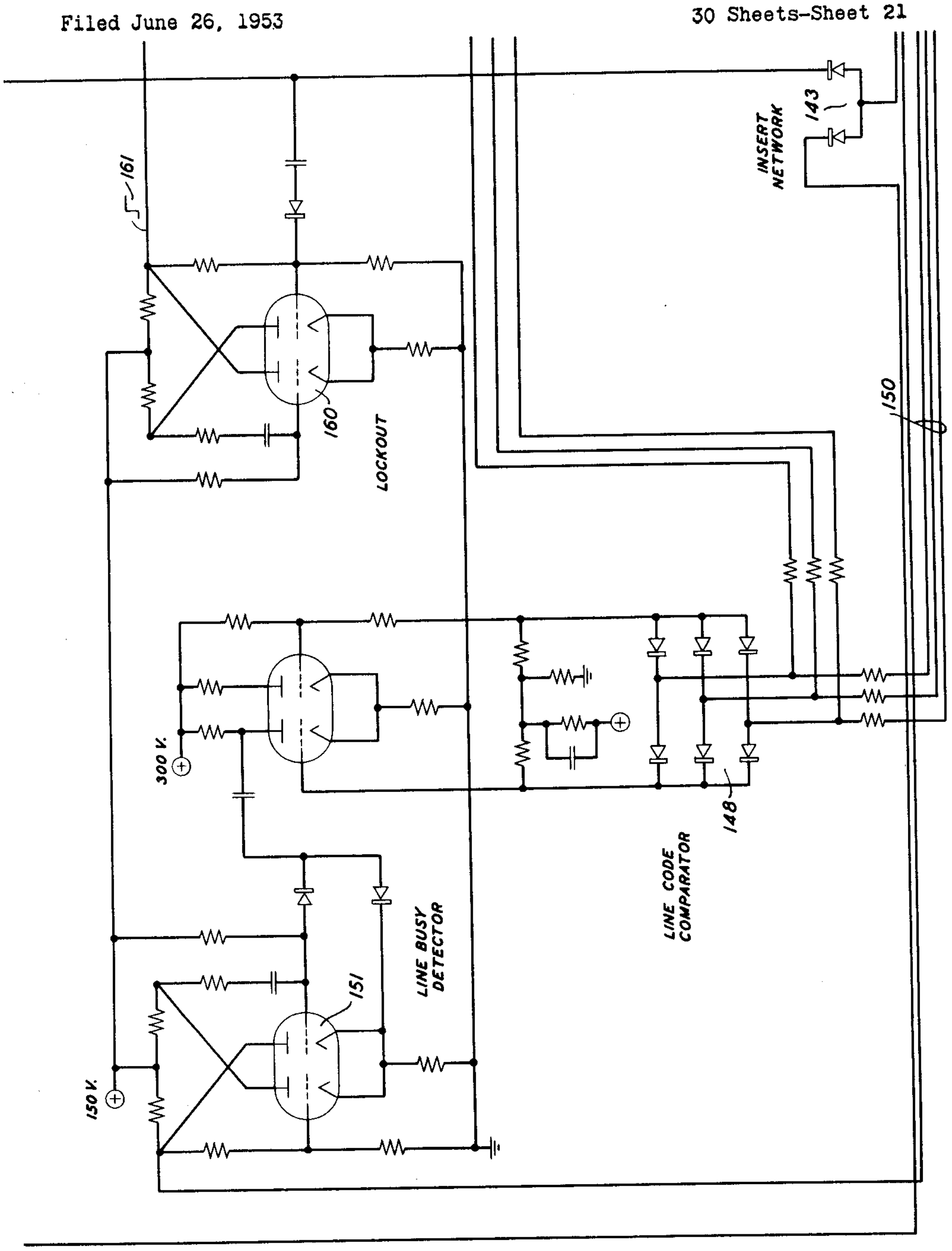
Figure 23:
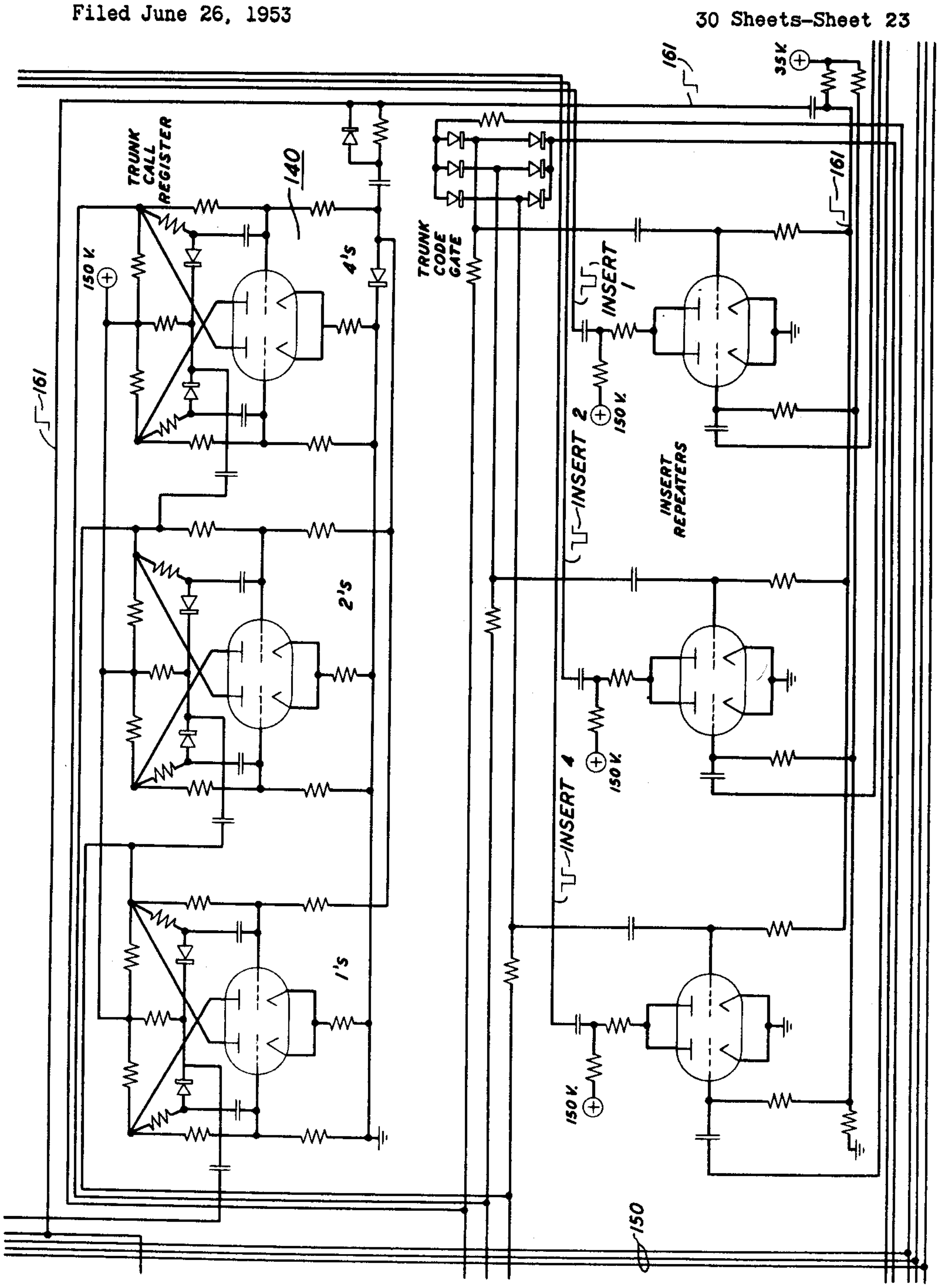

When the called number has been stored in the registers 140, it is necessary to determine whether the called line is busy before setting up the call between the line and the calling trunk. The code stored in the trunk call register 140 is applied to a trunk call code gate 142, which is held disabled by a control voltage from the enabler circuit 121, as applied through an insert network 143. Advantageously, the trunk code gate 142 comprises a varistor for each digit of the code registered in binary form in the registers 140, as seen in Fig. 23, while the insert network 143 is advantageously a positive AND gate, as seen in Fig. 21. When the dialing has been completed, the enabler circuit 121 restores due to the time constant of the capacitance 137 and associated resistance and the secondary influence of positive tickling pulses 145 from the five time slot pulser 117. This assures that the restore of the enabler circuit 121 and consequently the insert of the code into memory, as described below, are properly timed in the office cycle. Restore of the enabler circuit 121 blocks the office code delay gate 116, by applying a positive voltage to the gate 116, in place of the negative enabling pulse 123, and also removes one of the two disables from the insert network 143. At the next and also the final pulse of the one time slot pulser 114, a positive enabling pulse is applied to the insert network 143 allowing the trunk call code gate 142 to be enabled.

Meanwhile, the called line code has also been applied to a line code comparator circuit 148, best seen in Fig. 21, which compares the code with the various codes circulating in the memory 56, the codes circulating in the memory being applied, by the memory channels 92, to leads 150 and thus to the line code comparator circuit 148. If at the completion of dialing a match is found, then the called line is busy. The comparator circuit 148 will then pulse once per office cycle, at each occurrence of the match and a busy detector circuit 151, best seen in Fig. 21, enabled by this pulsing. The line busy detector circuit 151 applies a positive pulse to the trunk call code gate 142 so that the code applied to that gate is a special code, and advantageously the code assigned the highest binary number, in this embodiment binary 111 or line 7. The connection is so arranged that this code takes precedence over the code stored in the registers 140. Then when insert occurs, the code of this special line is inserted into memory and this line is chosen by the translator 52. A positive voltage is thus applied to the lead 152, seen connected to the translator 52 in Fig. 9, and through lead 152 to the busy tone gate 154, seen in Fig. 12. Operation of this gate, which is advantageously a triode, applies a busy tone, from a busy tone source 156, to the common bus 22 in the time slot of the calling trunk.

The particular code that is employed for application of the busy signal to the common talking bus 22 will be a matter of choice, but it has ben found advantageous to employ the highest code available in the system, i.e. that code which is represented by all positive pulses. Thus, in other specific embodiments of this invention wherein larger numbers of lines are connected to a telephone exchange in accordance with this invention, different special codes may be employed.

Figure 18:
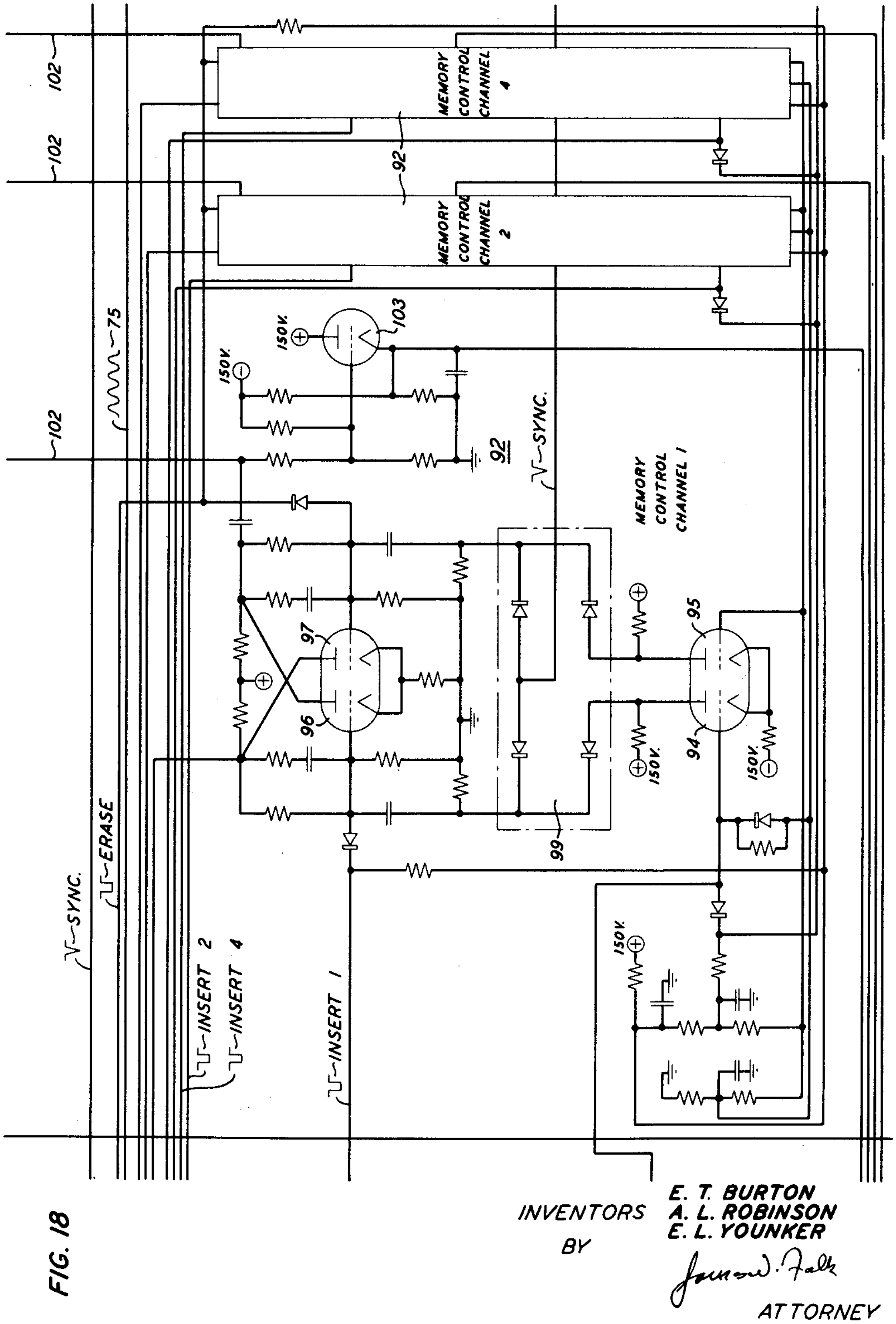
Figure 19:
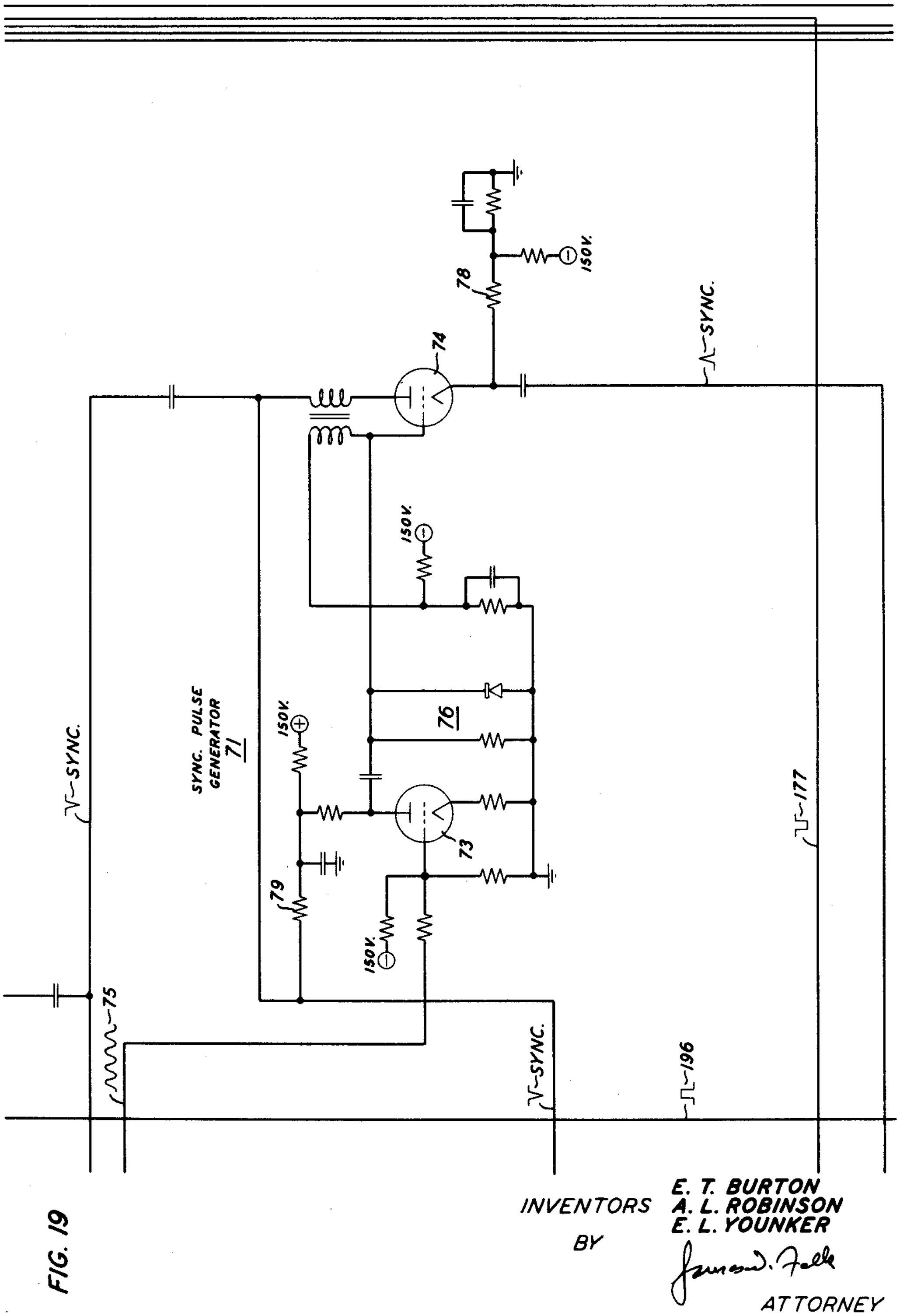

If the called line is not busy, enabling of the trunk call code gate by the insert network 143, as described above, allows the code stored in the trunk call register circuit 140 to be applied to the right-hand grid of each of the twin triodes of an insert repeater circuit 158, causing that circuit to transmit insert pulses, seen in Figs. 23, 22 and 18, as insert 1, 2, or 4 pulses, to the memory control channels 92 where the code is inserted into the circulating memory, as described above. When the code is circulating in the memory in the time slot assigned the calling trunk, the called line will be applied to the common bus 22, under control of the line gate 21 individual thereto, during each occurrence of that time slot and the connection through the office between the called trunk and the calling line will have been thus set up.

When the enabler circuit 121 restores, a lockout circuit 160, a specific illustrative embodiment of which is seen in Fig. 21, is tripped; this lockout circuit 160 restores itself after holding for at least one office cycle. While it is tripped, the lockout circuit 160 provides an enabling voltage 161 to the normally cut off grids of the twin triodes insert repeater circuit 158, permitting the repeater circuit to function as above described. During the insert period the lockout circuit 160 also disables the trunk scan network 106 by applying the voltage 161 to the blanking repeater 109, in the same manner as the blanking pulse 130 is applied from the four and five time slot pulsers 115 and 116. In the block diagram of Figs. 2 through 5, blanking voltages 130 and 161 are shown applied to the blanking repeater 109 over separate leads, while in the specific illustrative embodiment depicted in Figs. 6 through 27, they are depicted as being applied over the same lead.

While the lockout circuit 160 is tripped, the office cycle delay circuit is interrupted, as the gate 116 is disabled. The inserted code, however, now appears through the memory indicator circuit 108, preventing the trunk scanning repeater from receiving further pulses in this time slot. On resetting, the lockout circuit 160 resets the trunk call register 140 to zero and disables the insert repeater circuit 158. The operation of setting up the call is now completed, the circuits employed restored, and scanning of the common bus 22 may continue.

While only a single trunk call service circuit 37 has been depicted in the specific illustrative embodiment of this invention shown in the drawing, it is to be understood that in a larger telephone exchange, in accordance with this invention, wherein a considerably larger number of trunks are available to the exchange, additional call service circuits could be employed so that calls could be simultaneously processed on requests from more than one trunk at a time. In such a case, the trunk scan network 106 would apply pulses to trunks and repeaters 112 associated with the different trunk call service circuits 37, and the blanking repeater 109, instead of entirely blocking the trunk scan network 106, would cause that network to transmit the scan signals to the next trunk scan repeater. It is thought apparent to persons skilled in the art wherein these and other modifications could be made within the spirit and scope of this invention.

*Calls originating on subscribers' lines*

Let us now consider how a connection is established through this specific embodiment of a telephone exchange in accordance with our invention when a request for service is received from one of the subscriber lines 20. As mentioned above, not all the time slots of the office cycle are assigned to trunks, but certain of the time slots are reserved for special functions. In this specific embodiment of the invention the ninth time slot is utilized for scanning the common talking bus 22 to ascertain the presence of off-hook signals from the lines 20. Each line code is applied to the memory in the ninth time slot in sequence, so that lines are scanned at the rate of one line per office cycle.

Figure 5:
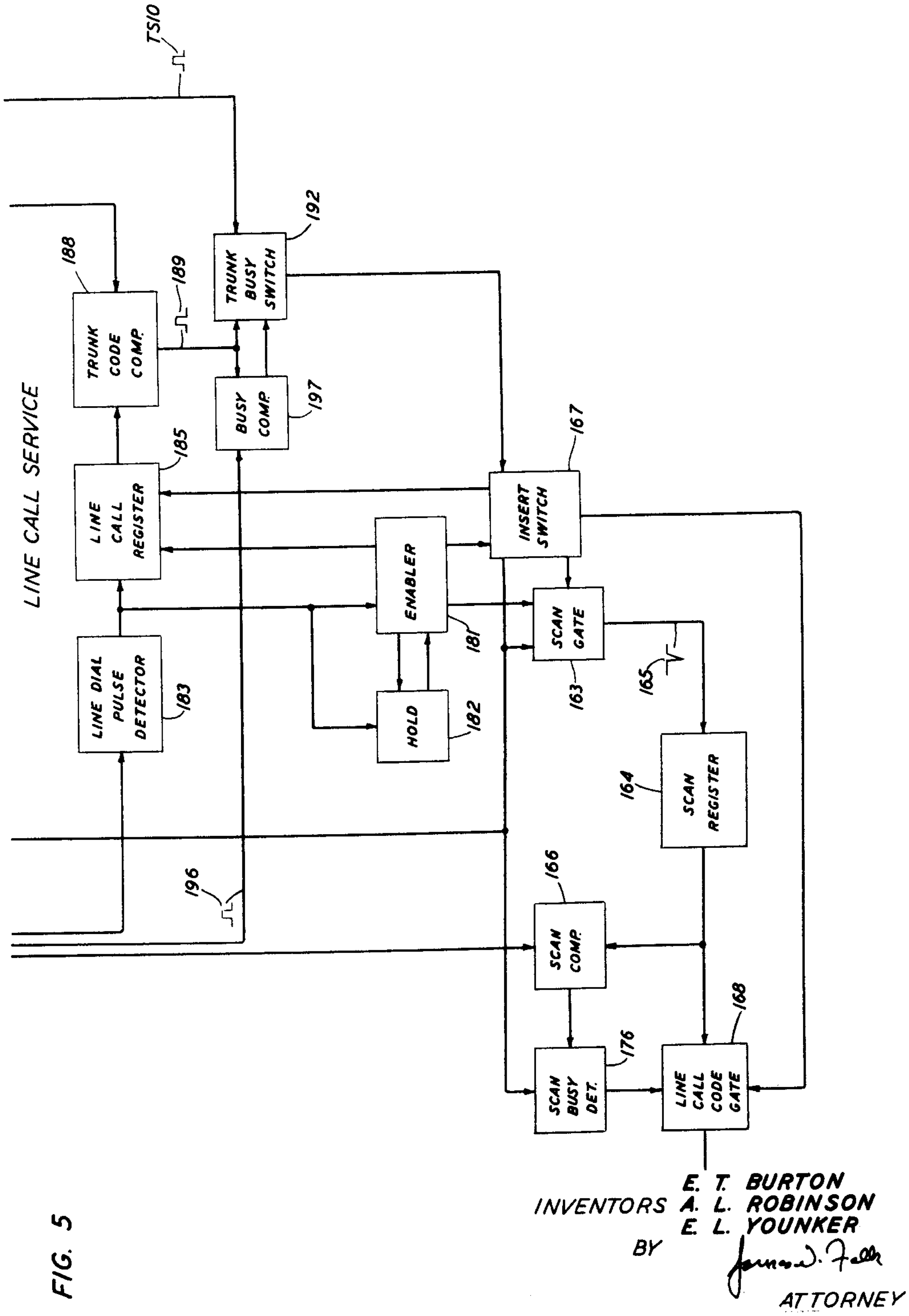
Figure 6:
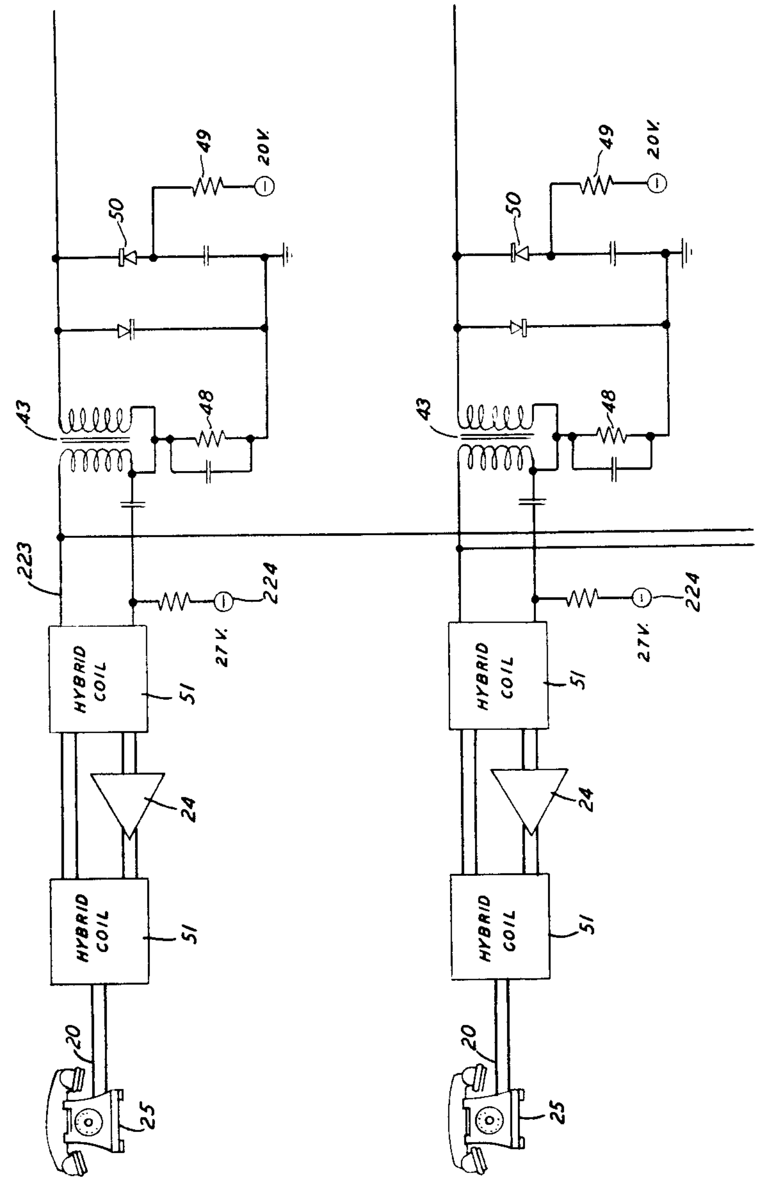
Figs. 6 through 27 are a schematic representation of the specific embodiment of Fig. 1, the arrangement of Figs. 6 through 27 being shown in the key diagram of Fig. 32.
Figure 24:
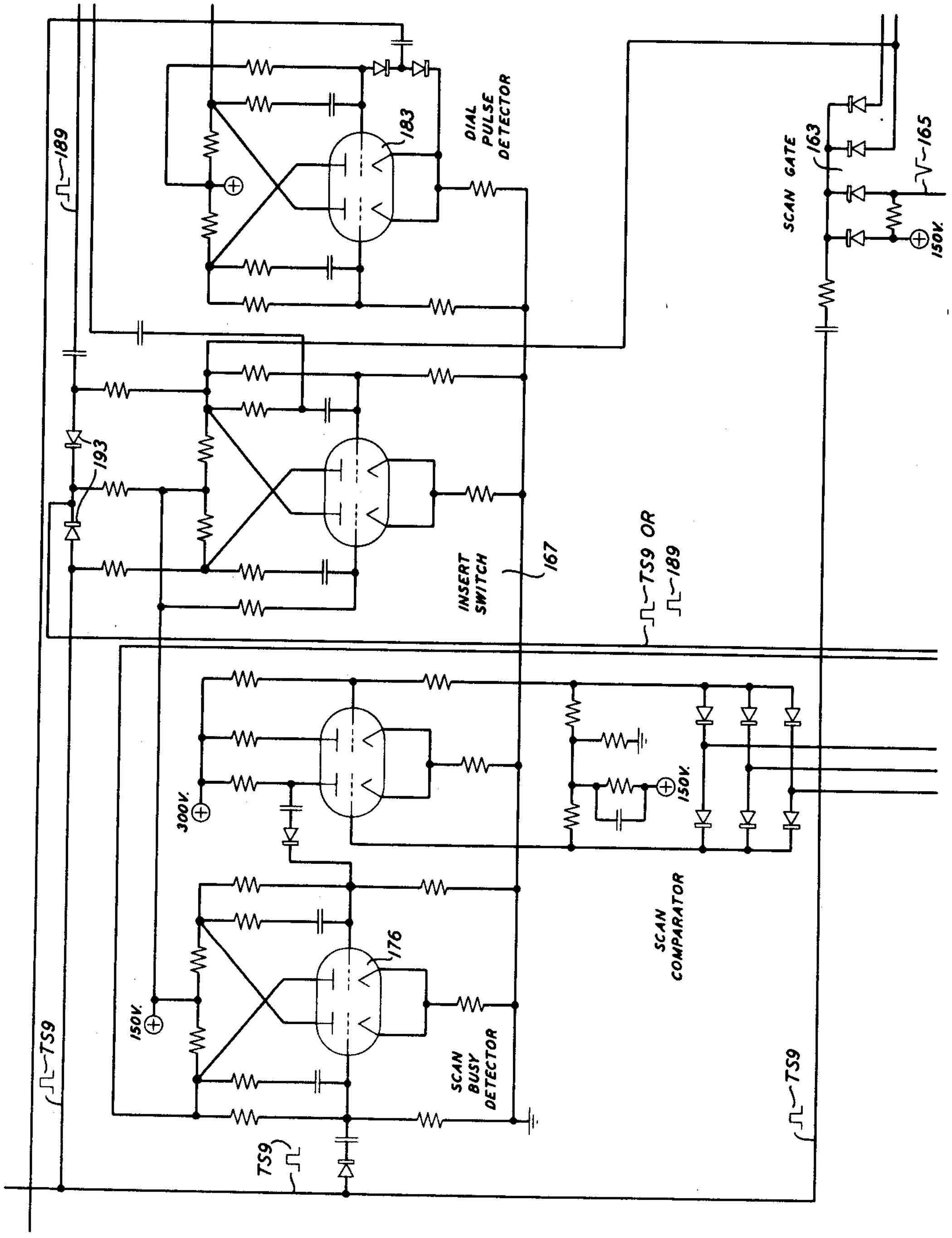
Figure 25:
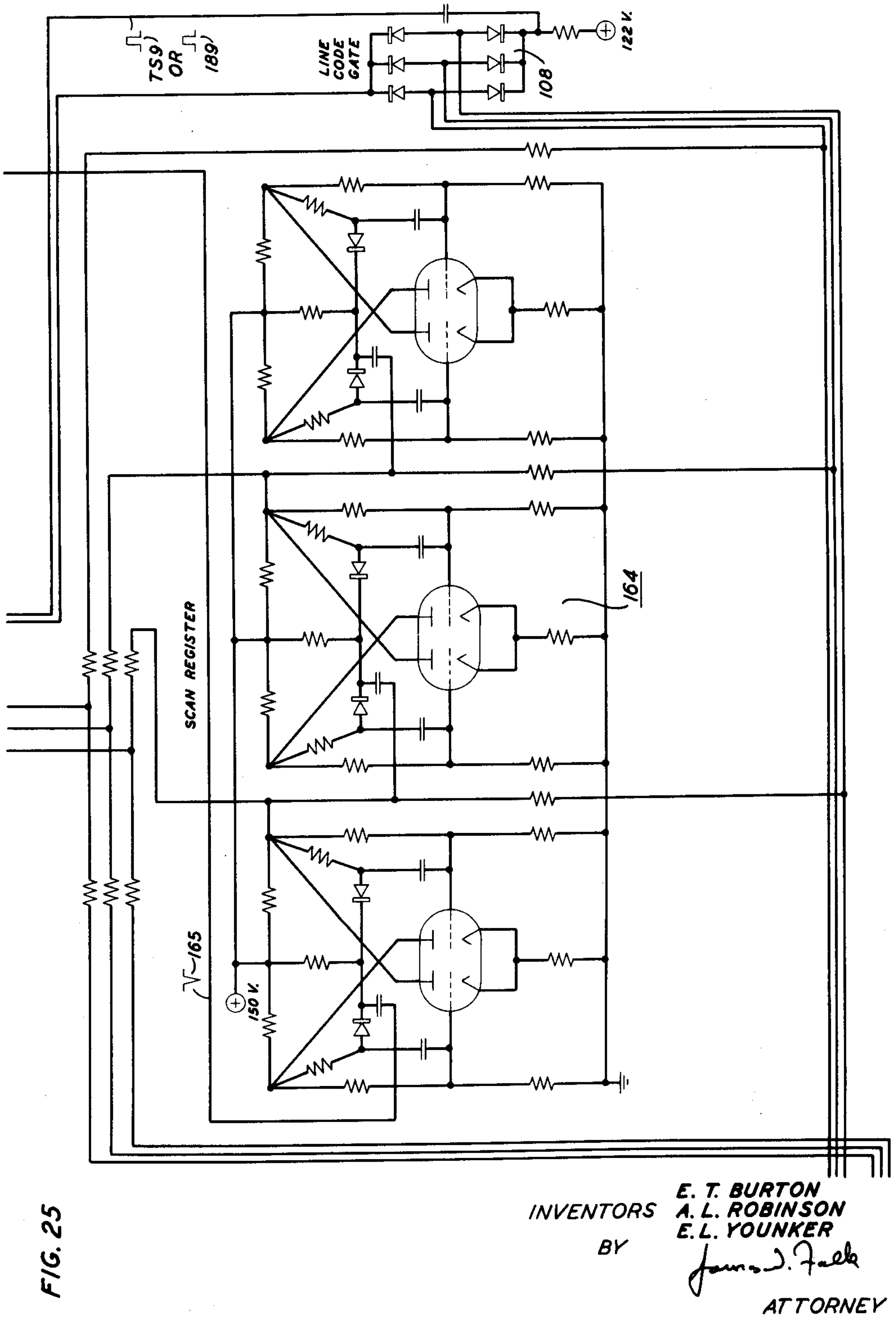

In scanning the common bus 22 to determine whether a line 20 is requesting service, the ninth time slot pulse TS9 from the translator 53 is applied at each occurrence to a scan gate 163, seen in block diagram form in Fig. 5 and one embodiment depicted in detail in Fig. 24. This gate generates a negative spike 165 at the end of the time slot to cause a scan register 164 to advance by one, the register 164 being seen in Figs. 5 and 25 and advantageously being similar to the trunk call register 140, described above. Through the following nine time slots the codes circulating in the memory 56 are examined by a scan comparator circuit 166 to determine if a match exists between a code in memory and the code in the scan register 164; if not, the line is not busy and therefore may be requesting service. In the following office cycle the ninth time slot pulse TS9 is transmitted through an insert switch 167 to enable a line call code gate 168, seen in Figs. 5 and 25, which code gate is advantageously similar to the trunk code gate 142 described above. Enablement of the line code gate 168 inserts the code stored in the scan register circuit 164 into the insert repeaters 158 and thence into the memory 56, as described above. This insertion is of course made in the ninth time slot in the office cycle.

At the same time the ninth time slot pulse TS9 is applied to a line scan network 171, seen in Figs. 3 and 10, to enable this circuit to pass a pulse from the bus pulse shaper 105 if an off-hook signal is present on the common bus 22 from the line whose code has been inserted into the circulating memory in the ninth time slot. If no pulse is received by the line scan network 171 that particular line is not requesting service; at the end of this ninth time slot the scan gate 163 therefore advances the scan register 164 to the next line code.

In order to prevent recirculation of the code inserted into the ninth time slot, a special erase circuit is advantageously provided in this specific embodiment of the invention for this time slot only. The inserted code must be active in the current office cycle, and therefore the general erase circuit, described below, which nullifies a code at the point where insert occurs, should not be used. The erase for the code in the ninth time slot is applied to the grids of triode sections 94 and 95 of the memory control channels 92, described above, As has been noted above, a code in a given time slot appears at these triode sections a half time slot before it arrives at the reading point, triode sections 96 and 97. In this specific embodiment the erase pulse for the ninth time slot is obtained by taking the control voltage of the trunk gate 40 for the trunk assigned to the eighth time slot, applying it also to a special gate 174, seen in Fig. 14, and delaying the output pulse from gate 174 one half time slot by a half time slot delay circuit 175. The delayed pulse 177 is introduced into the memory control channels 92. This removes any code circulating in memory in the ninth time slot after it has made one passage. Thus the memory loop for the ninth time slot is continuously interrupted and any code which is to be used must be inserted at each office cycle.

When, in the process of line scanning, the code of a busy line appears in the scan register 164, the scan comparator 166 pulses when the match with the code in memory occurs. This pulse locks up a scan busy detector circuit 176 which in turn disables the line code gate 168, preventing the insertion of a code. The scan gate spike 165 at the end of the following ninth time slot pulse restores the scan busy detector circuit 176 and scanning of line numbers continues.

Figures 7, 32:
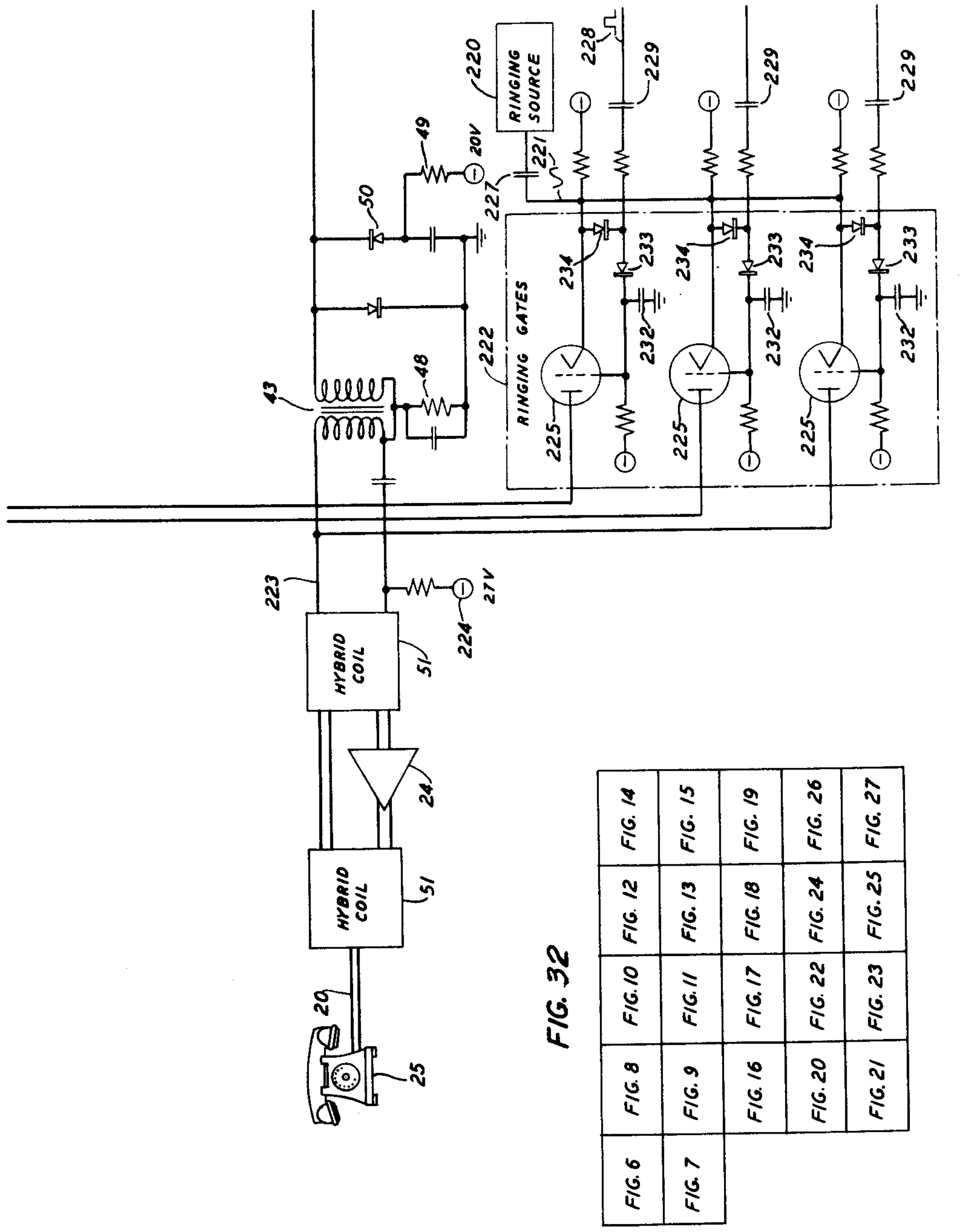

If an off-hook signal is encountered when a line is scanned, the line scan network 171 passes a pulse in the ninth time slot of that office cycle to a line scan repeater 180, seen in detail in Fig. 7. The output of the line scan repeater 180 trips an enabler circuit 181 which is then held up by operation of a hold circuit 182, both seen in detail in Fig. 26, acting through a line dial pulse detector circuit 183, seen in detail in Fig. 14, the operation being similar to that of the trunk dial pulse detector circuit 120, enabler circuit 121, and hold circuit 124 described above with reference to calls originating from a trunk. The enabler circuit 181 disables the scan gate 163 and therefore the scan register 164 inserts the same code into memory in the ninth time slot of each succeeding office cycle, thus attaining seizure of the line presenting an off-hook signal. At each recognition of the off-hook condition on this line the line scan repeater 180 actuates the dial tone control circuit 131, seen in detail in Fig. 10, thus putting dial tone into the ninth time slot.

Figure 26:
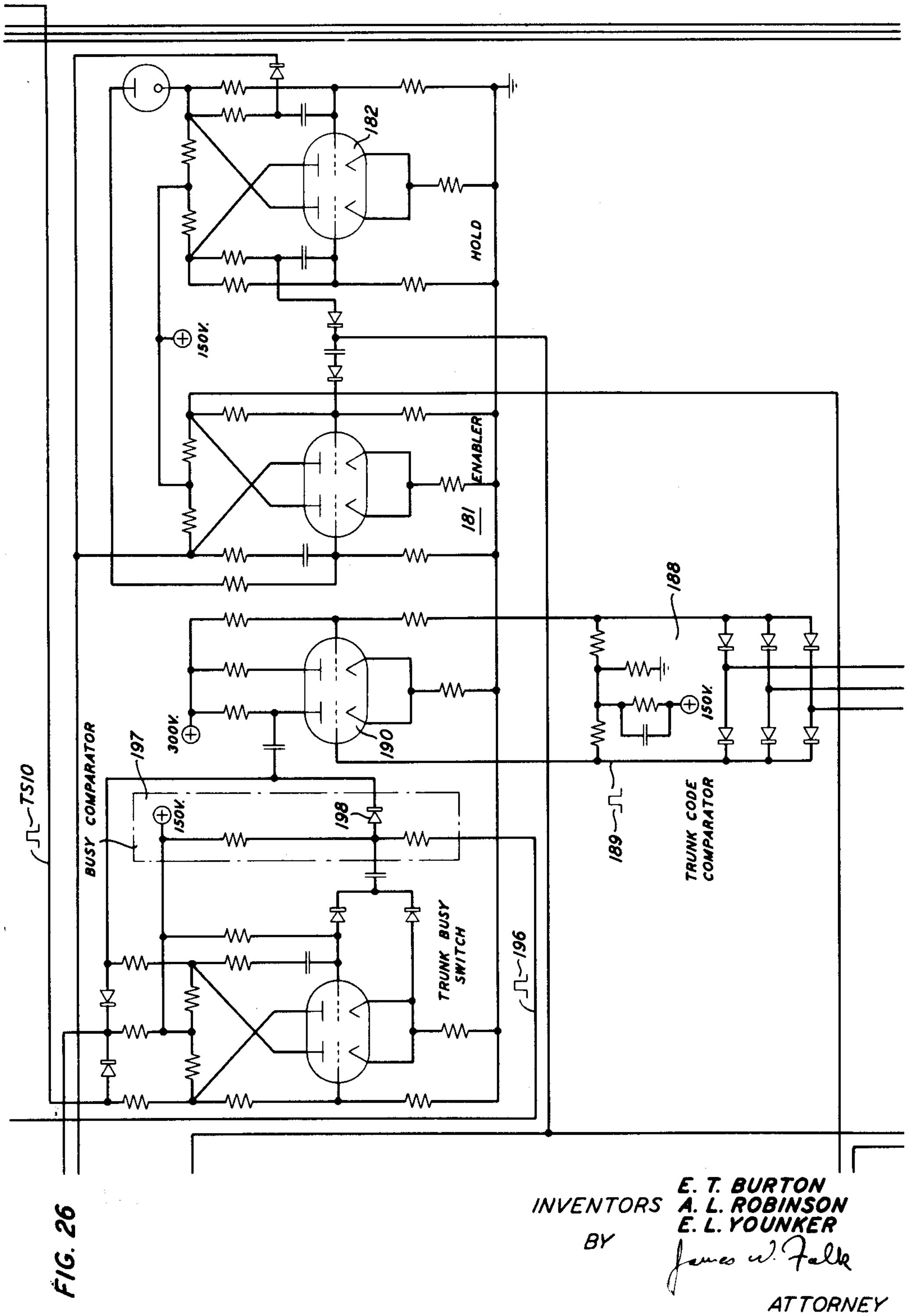
Figure 27:
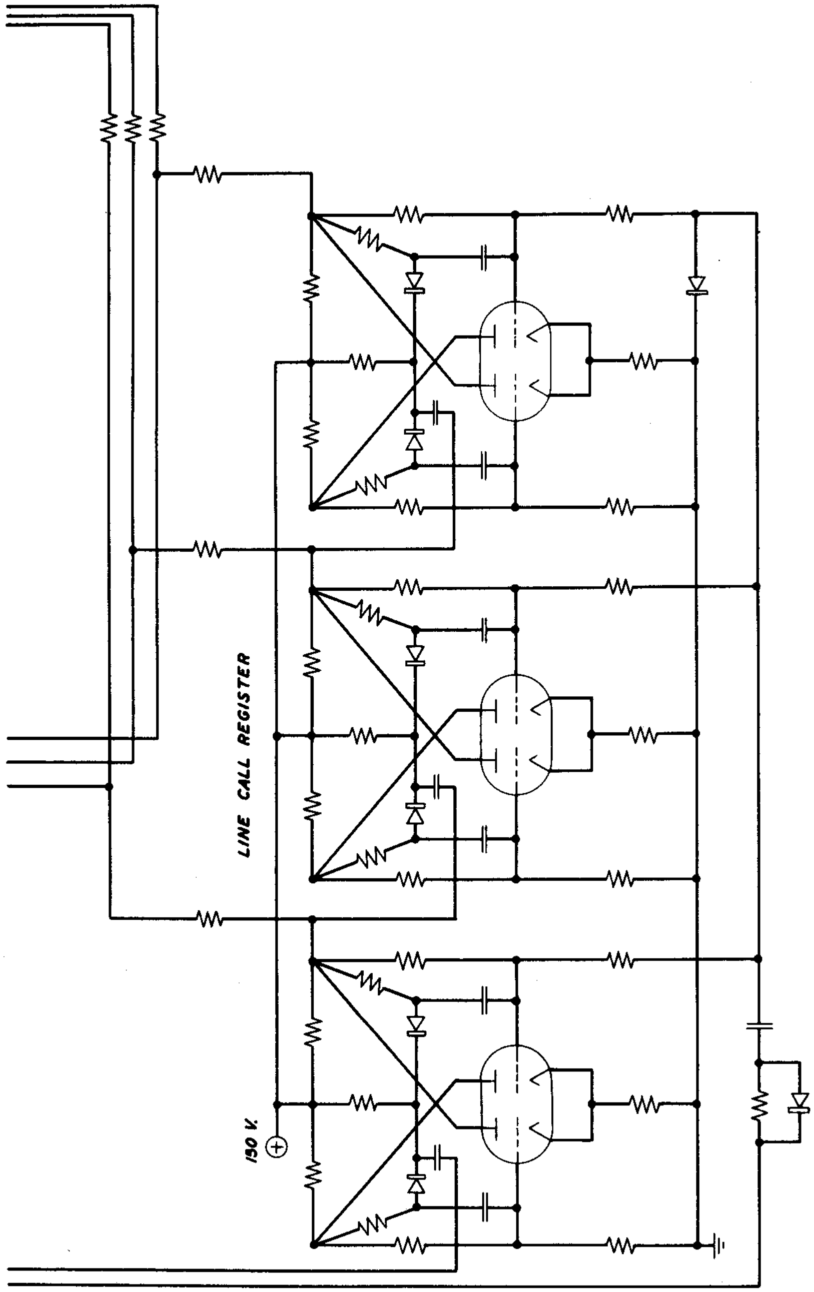

At the start of dialing the hold circuit 182 releases the enabler circuit 181, which restores only after dialing is completed. The dial pulse detector 183 delivers the dialed code to the line call register 185 where the code is stored in binary form. Advantageously in a large telephone exchange in accordance with this invention just the portion of the dialed code identifying the particular distant office in which the called subscriber is located is utilized to choose an outgoing trunk and thus only this portion of the code is stored in the line call register. A trunk code comparator circuit 188, seen in detail in Fig. 26, compares the code in the line call register circuits 185 with the outputs of the trunk translator 53. A match will occur in the time slot of the office cycle assigned to a trunk going to the called distant office and the resulting output pulse 189 from the comparator circuit 188 identifies the time slot of the called trunk.

If the called trunk 27 thus identified is not busy the trunk identifying pulse 189 is transmitted through a triode 190 and the open trunk busy switch 191 to the insert switch 167, which switch circuit advantageously includes a pair of varistors 193 or other diode elements normally allowing passage of the ninth time slot pulse TS9 to the out code gate 168 as described above. When the enabler circuit 181 restores, the conduction state of the twin triode stages of the insert switch circuit 167 is reversed and the insert switch 168 momentarily connects the trunk identifying pulse 189 to the out code gate 168, thereby causing the code stored in the scan register 164 to be inserted into memory in the time slot identified by the trunk code comparator circuit 188 as that of the called trunk.

The insert switch circuit 167 is advantageously self-restoring after holding up at least one office cycle. On restoring, it removes a disable from the scan gate 163 and resets the line call register 185 to zero. Scanning of the common bus 22 for requests for service from an incoming trunk can then begin again.

Figure 11:
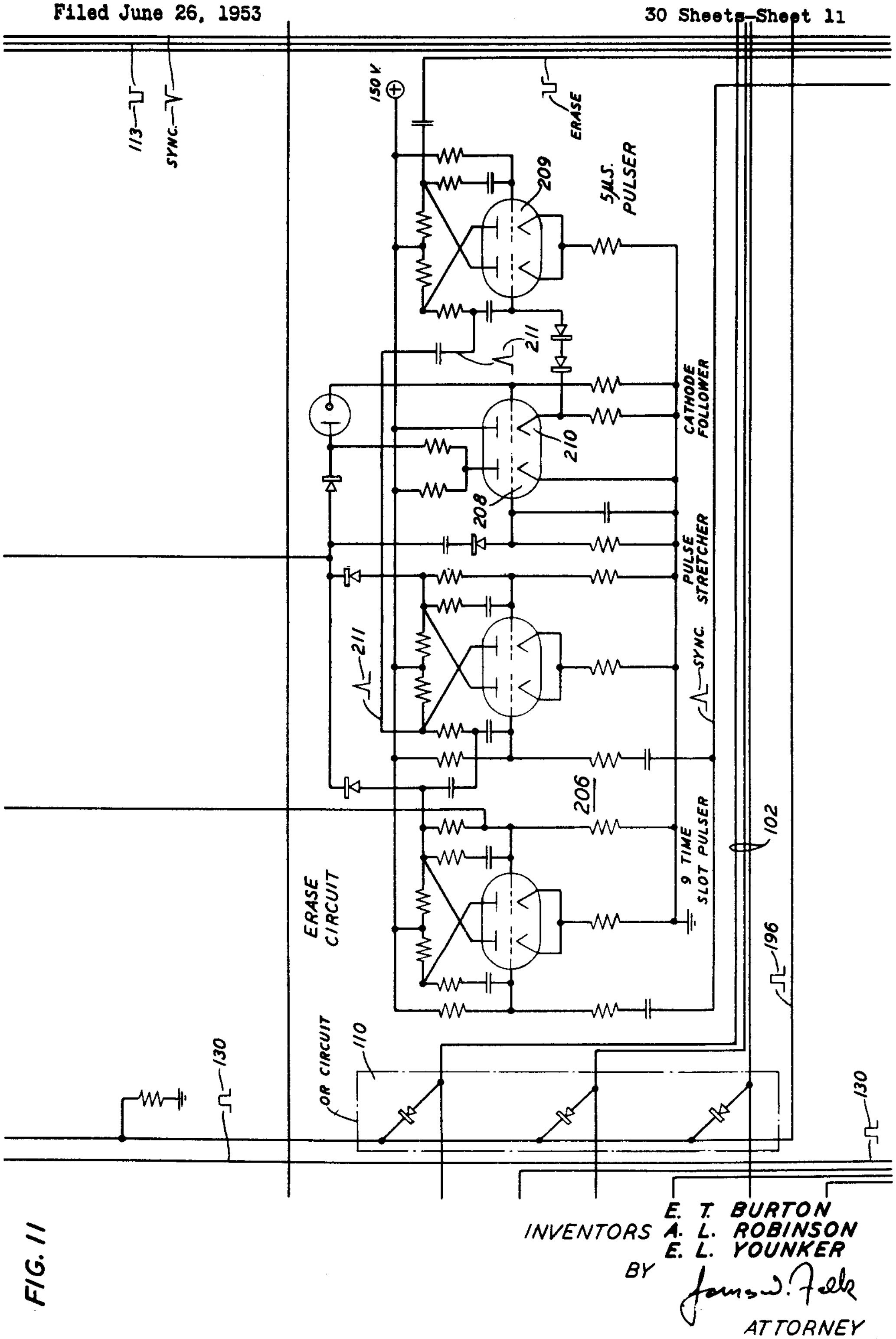

If the trunk 27 that had been dialed is busy a line code would be circulating in memory in the time slot of that trunk and therefore a pulse 196 would be transmitted through the OR gate 110, seen in Fig. 11, to a busy comparator circuit 197, seen in Fig. 26. This comparator circuit 197, which advantageously comprises a single varistor 198 or other diode element, causes the conduction in the twin triode stages of the trunk busy switch 192 to reverse to block passage of the trunk identifying pulse 189 through the trunk busy switch 192. Instead a pulse TS10 which is transmitted by the trunk translator 53 in the tenth time slot in the office cycle is passed through the busy switch circuit 192 to the insert switch circuit 167. Now when the enabler restores, the insert switch output causes the line call code gate 168 to insert the calling line number into the tenth time slot in the circulating memory. A pulse in this time slot is also applied to the busy tone gate 154, seen in detail in Fig. 12, which now provides a busy signal, as described above, to the calling line.

In the above description of the application of a busy signal to the common bus and thus to the calling line whose code has been inserted into the tenth time slot in the office cycle, it has been assumed that there is but one trunk from the telephone exchange in accordance with this invention to each distant office. Such of course will not be the case in large offices. Generally a number of trunks will be assigned to a given office code, identifying the distant office to which these trunks go; each of these trunks, however, will be assigned a distinct time slot and thus a distinct code in the telephone office in accordance with this invention. It therefore may be desirable to utilize a translator circuit with the trunk sequence 55 so that when a code identifying the trunk is applied to the translator from the trunk sequence, in the time slot of that trunk, the output of the translator will be the code identifying the office to which the trunk extends. Thus several trunks may be identified by the same code from this translator. These codes from the translator are then applied to a comparator circuit, such as the trunk code comparator circuit 188, to which is also applied the dialed code. The output of the comparator circuit represents the time slot positions of all trunks to this called office. This output is then compared with a memory indication, as by the busy comparator circuit 197, to nullify all pulses in time slots assigned busy trunks. A one office code delay circuit, similar to that described above, seizes one of the pulses identifying an available trunk, locking out other pulses, and inserts the code in memory in the time slot of that trunk as described above.

It is believed apparent to persons skilled in the art wherein other procedures may be devised for particular embodiments of this invention wherein the trunks may be direct connections to other subscriber telephones, may be connections each to a distinct office, or may be formed into groups comprising different numbers of trunks, each group extending to a different office.

In the embodiment of this invention described herein, any number of trunks may have a busy signal applied to them at the same time by inserting the code for line 7 in the time slot of each of the trunks. However, when a line places a call and finds a busy condition, the calling line code is inserted into a time slot providing a busy signal, namely, time slot 10. It is therefore apparent that in the embodiment described above only one line can have a busy signal applied to it at a time. While this is acceptable in a very small telephone exchange of the type described herein, in which the time the second line may have to wait for the busy signal is not likely to be large, it is preferable in a large exchange to be able simultaneously to apply a busy signal to a number of lines. This may be accomplished by sharing the tenth time slot among the calling lines requiring busy signals, as by storing in special registers the calling line codes and inserting them in succession in the tenth time slot in the circulating memory. If three lines require busy tones, the codes of these three lines will be stored in three registers and inserted in successive office cycles into the tenth time slot. Due to the time intervals involved the busy tone will thus appear to be present simultaneously on the three lines while actually being applied in succession to them.

*Erasure of codes*

At the termination of call it is necessary to erase the pertinent code from the circulating memory without disturbing other circulating codes. It is also desirable to be able to distinguish between a momentary absence of pulses from the bus pulse shaper circuit 105 and an actual hang up condition. The operating input of the erase circuit, which is depicted mainly on Fig. 11, is provided from the sync pulse generator 71, seen on Fig. 19, through a sync delay circuit 202, seen in Fig. 10 and also on the block diagram of Fig. 2. This circuit is further described in Patent 2,802,940, issued August 13, 1957, of E. T. Burton. This delay provides time for the call selector circuit to make a decision. The delayed spikes are then applied to an erase scan network 203, which is also supplied with positive pulses from the bus pulse shaper 105 and negative pulses from the memory indicator 108. Under these controls the delayed sync pulses are permitted to pass through the erase scan network 203 only in a time slot in which memory codes appear while the bus pulse is absent. This is the condition identifying either a hang up or a momentary interruption of bus pulses. The circuit must scan this time slot to determine which has actually occurred.

In order to accomplish this determination the delay sync spike is applied to an erase spike repeater 205 and then to a nine time slot pulser 206. This pulse applies a blanking voltage to the erase scan network 203, making impossible the passage of any of the following nine sync spikes. However, the network 203 is enabled in the tenth spike, which is identified with the time slot in which the erase spike repeater previously operated. If no bus pulse appears in this time slot, a sync spike is again passed and the above process is repeated during the following office cycle. At the termination of each pulsing period, the ninth pulser 206 activates the pulse stretcher 208 which holds for at least one time slot. The combination of the outputs of the 9TS pulser 206 and the pulse stretcher 208 results in a continuous holding voltage which is applied to a 5$\mu$ second pulser 209 through the cathode follower 210. This pulser 209 requires application of input voltage for about 2½ mil seconds, at the end of which it generates a 5$\mu$ second pulse and restores. This is an erase pulse which is delivered to the circulating memory. The erase pulse must be applied in the time slot to which the erase spike repeater 205 is responding. This is the time slot following the restore of the 9TS pulser. Therefore a tickle spike 215, generated by the restore of this pulser, is applied to the 5$\mu$ second pulser 209 as a secondary control on the trip.

If, during the erase scan period, the bus pulses reappear, the interruption was not a hang up. In this case the 9TS pulser 206 ceases receiving input pulses. Therefore both it and the cathode follower 210 restore quickly releasing the operating voltage which has been building up to trip the 5$\mu$ second pulser 209. This returns the circuit to its original state ready to scan for other hang ups.

*Ringing of subscriber lines*

In the above description the application of a ringing current to the subscriber phones 25 was not discussed. Various circuits may be employed for this purpose in the general combination of this invention, one such circuit being shown on Fig. 7. Whenever a line code is circulating in a trunk time slot in memory but the subscriber phone connected to that line is still on hook, ringing current should be applied to that phone. A ringing source 220 which provides a low voltage ringing signal 221 should therefore be connected through ringing gates 222 to a lead 223 of that subscriber line 20, the hybrid coils 51 being connected in the subscriber line 20 so as to provide a direct current path to the ringing element of the telephone 25.

The ringing gates 222 may advantageously comprise a low voltage tube 225 individual to each subscriber phone 25, the plate of the tube 225 being connected to the lead 223 of line 20. The plate of the tube is therefore at ground potential for the on-hook condition and at a negative potential, which in this specific embodiment we have stated to be −27 volts, for the off-hook condition, the negative potential being applied through the closed direct current loop of the subscriber line 20 from source 224. The ringing signal 221 is applied, through a condenser 227, to the cathodes of the tubes 225, all the cathodes being multiplied together. A negative voltage is also applied to the cathodes such that when the plate is at ground potential, there is sufficient plate voltage to allow conduction in the tube.

Each of the control grids is connected to the output lead of the line translator 52 identified with the subscriber line to which the tube 225 is connected. The grids are biased by a negative potential so as to be below cut off. When a positive pulse 228 is applied from the translator 52 through a capacitor 229, advantageously of a small value of capacitance, to the control grid of a tube 225, that tube will conduct if, and only if, there is ground potential at its plate and therefore if, and only if, the subscriber phone 25 is in the on-hook condition.

Advantageously a capacitor 232, of a larger value of capacitance than capacitor 229, is connected between the control grid and ground, and a pair of diodes 233 and 234 are connected in the cathode and control grid leads so that the capacitor 232 can charge up on appearance of a pulse 228 to allow the tube 225 to conduct for a major portion of the office cycle, rather than just in the time slot of the calling trunk. If desired an amplifier may be positioned between the plate of each tube 225 and the leads 223.

While a specific illustrative embodiment of this invention has been described herein, it is of course to be understood that the above-described arrangements are merely illustrative of the application of the principles of the invention. Certain modifications have been suggested at various points in the description by which communication systems in accordance with this invention could be more readily adapted to specific tasks, such as being employed as a small telephone exchange between two different groups of subscribers, a large telephone exchange between a large group of subscribers and a smaller group of trunks to distant offices, etc. Similarly certain of the circuits utilized in the general combination of the invention might be changed. Thus the sequence circuit described in Patent 2,802,940, issued August 13, 1957, of E. T. Burton might advantageously be employed in place of certain of the one office cycle delay circuits employed to repeatedly scan a particular time slot in the office cycle. Thus, numerous other arrangements may be devised by those skilled in the art without departing from the spirit and scope of the invention.

What is claimed is:

1. A time separation switching system comprising a plurality of first communication paths, a plurality of second communication paths, a common transmission path, first gating means for connecting any one of said first communication paths to said common transmission path, second gating means for connecting any one of said second communication paths to said common transmission path, means for enabling said first gating means to connect each of said first communication paths individually and in time sequence to said common transmission path in a particular one of a plurality of time slots in the repeated cycle defined by said time slots, memory means comprising a closed circuit including a delay line, the total delay of said closed circuit being one cycle, means for inserting a signal at a point in said closed circuit identifying a particular one of said second communication paths, said signal being inserted in a time slot assigned a particular one of said first communication paths, and means for enabling said second gating means on each occurrence of said signal at said point in said closed circuit to connect said particular second communication path to said common transmisison path when said particular first communication path is connected to said common transmission path by said first gating means.

2. A time separation switching system in accordance with claim 1 wherein said memory means comprises a plurality of closed circuits, a single delay line, and means for circulating signals identifying said second communication paths in different frequency channels through said delay line.

3. A time separation switching system in accordance with claim 1 wherein said means for enabling said first gating means includes means for generating synchronizing pulses defining said time slots, a counter circuit, means applying said synchronizing pulses to said counter circuit, and means actuated by the output of said counter circuit for enabling said first gating means to connect said first communication paths individually to said common transmission path.

4. A time separation switching system in accordance with claim 3 wherein said memory means comprises a plurality of closed circuits, a single delay line, and means for circulating signals identifying certain of said second communication paths in different frequency channels through said delay line and said means for generating synchronizing pulses includes means for circulating pulses in a closed circuit in still another frequently channel through said single delay line.

5. A time separation switching system in accordance with claim 4 wherein said delay line comprises an acoustic delay line.

6. A time separation switching system comprising a plurality of first communication paths, a plurality of second communication paths, a common transmission path, first gating means for connecting any one of said first communication paths to said common transmission path, second gating means for connecting any one of said second communication paths to said common transmission path, means for enabling said first gating means to connect each of said first communication paths individually and in time sequence to said common transmission path in a particular one of a plurality of time slots assigned to said first communication path in the repeated cycle defined by said time slots, means for recognizing the presence of a signal voltage on said common transmission path in a time slot assigned to one first communication path when none of said second communication paths is connected by said second gating means to said transmission path in said time slot, means for receiving signals from said transmission path in said time slot identifying a particular one of said second communication paths, memory means comprising a closed circuit including a delay line, the total delay of said closed circuit being one cycle, means for inserting said identifying signals at a point in said closed circuit in said time slot assigned to said one first communication path, and means for enabling said second gating means on each occurrence of said signal at said point in said closed circuit to connect said particular one of said second communication paths to said common transmission path in said time slot and thus to said one first communication path.

7. A time separation switching system in accordance with claim 6 further comprising means for comparing said signals received from said transmission path identifying said particular one of said second communication paths with said signals circulating in said memory means, and means for inserting a special signal message in said closed circuit in said partciular time slot on recognition by said comparing means of agreement between said signals received from said transmission path and said signals circulating in said memory means.

8. A time separation switching system in accordance with claim 7 further comprising a source of signals indicating that a desired communication path is unavailable, gate means for connecting said source to said common transmission path, and means for enabling said gate means on occurrence of said special signal message in said closed circuit to connect said source of signals to said common transmission path in said particular time slot.

9. A time separation switching system comprising a plurality of first communication paths, a plurality of second communication paths, a common transmission path, first gating means for connecting any one of said first communication paths to said common transmission path, second gating means for connecting any one of said second communication paths to said common transmission path, means for enabling said first gating means to connect each of said first communication paths individually and in time sequence to said common transmission path in a particular one of a plurality of time slots assigned to each of said first communication paths in the repeated cycle defined by said time slots, memory means comprising a closed circuit including a delay line, the total delay of said closed circuit being one cycle, means for successively inserting signals identifying different second communication paths in said memory means in a time slot in said cycle not assigned to a first communication path, means for receiving signals in said last-mentioned time slot from one of said second communication paths identifying a first communication path, means for inserting signals identifying said last-mentioned second communication path in the time slot of said last-mentioned first communication path at a point in said memory means, and means for enabling said second gating means on each occurrence of said signals identifying said last-mentioned second communication path at said point in said memory means to connect said last-mentioned second communication path to said common transmission path in the time slot of said last-mentioned first communication path.

10. A time separation switching system in accordance with claim 9 further comprising means for determining that signals identifying a second communication path are circulating in said memory means in the time slot of said last-mentioned first communication path, and means controlled by said last-mentioned means for inserting signals identifying said last-mentioned second communication path in said memory means in another time slot not assigned to one of said first communication paths.

11. A time separation switching system in accordance with claim 10 further comprising a source of signals indicating that a desired communication path is unavailable, gate means for connecting said source to said common transmission path, and means for enabling said gate means on occurrence of signals identifying said last-mentioned second communication path in said memory means in said another time slot to connect said source of signals to said common transmission path in said another time slot.

12. A time separation switching system comprising a plurality of first communication paths, a plurality of second communication paths, means assigning each of said first communication paths to a particular time slot in a repeated time sequence, memory means comprising a delay line and means for continuously circulating pulses through said delay line simultaneously in different frequency channels, means for inserting pulses into said memory means at a time slot of any of said first communication paths, means for regenerating said pulses on each transit through said delay line, and means for erasing any of said pulses in said memory means, said pulses identifying certain of said second communication means.

13. A time separation switching system in accordance with claim 12 further comprising means for generating synchronizing pulses identifying said time slots, said generating means comprising means for circulating a train of pulses through said delay line in still another frequency channel.

14. A time separation switching system in accordance with claim 13 wherein said delay line comprises an acoustic delay line.

15. A time separation telephone system comprising a plurality of lines, a plurality of trunks, a common transmission path, first gating means for connecting each of said trunks in succession to said path, each of said trunks being connected in a particular one of a plurality of time slots assigned thereto in the repeated cycle defined by said time slots, memory means comprising a delay line and means for circulating pulses through said delay line in said time slots, said pulses identifying particular ones of said lines, and second gating means for connecting said lines to said path on occurrence of pulses identifying said lines in particular time slots in said memory means.

16. A time separation telephone system comprising a plurality of trunks, a plurality of lines, a common transmission path, first gating means for individually connecting each of said trunks in succession to said path in a particular one of a plurality of time slots in the repeated cycle defined by said time slots, memory means comprising a closed circuit including a delay line, the total delay of said closed circuit being one cycle, means for inserting a signal at a point in said closed circuit identifying a particular line, said signal being inserted in a time slot assigned a particular trunk, and second gating means for connecting said particular line to said path on each occurrence of said signal at said point in said closed circuit.

17. A time separation telephone system in accordance with claim 16 comprising means for regenerating said signals on each transit through said delay line and means for erasing said signals when said particular line is no longer to be connected to said particular trunk.

18. A time separation telephone system comprising a plurality of trunks, a plurality of lines, a common transmission path, first gating means for individually connecting any one of said trunks to said path, means for generating synchronizing pulses, a counter circuit, means applying said synchronizing pulses to said counter circuit, means actuated by the output of said counter circuit for enabling said first gating means to connect each of said trunks in time sequence to said path in a particular time slot of a plurality of time slots assigned thereby to said trunk in the repeated cycle defined by said time slots, second gating means for individually connecting any one of said lines to said path, memory means comprising a closed circuit including a delay line, the total delay of said closed circuit being one cycle, means for inserting a signal at a point in said closed circuit identifying a particular one of said lines, said signal being inserted in a time slot assigned a particular one of said trunks, and means for enabling said second gating means to connect said particular line to said path and thus to said particular trunk on each occurrence of said signal at said point in said closed circuit.

19. A time separation telephone system in accordance with claim 18 wherein said first and second gating means comprise discharge devices individual to each of said trunks and lines.

20. A time separation telephone system in accordance with claim 18 wherein said memory means comprises a plurality of closed circuits, a single delay line, and means for circulating signals identifying said lines in different frequency channels through said delay line and said means for generating synchronizing pulses includes means for circulating pulses in a closed circuit in still another frequency channel through said delay line.

21. A time separation telephone system comprising a plurality of trunks, a plurality of lines, means assigning each of said trunks to a particular time slot in a repeated time sequence, memory means comprising a delay line and means for circulating pulses through said delay line identifying said lines, the total delay of said memory means being one time sequence, means for inserting pulses in said memory means, and means for regenerating said pulses on each circulation through said delay line, said regenerating means comprising a bistable flip-flop circuit including a plurality of discharge devices, a diode switch comprising diodes connected to the control electrodes of said flip-flop circuit discharge devices, means for biasing one of said diodes for passage of pulses therethrough when pulses are circulating in said memory means and for biasing another of said diodes when pulses are not circulating in said memory means, and means for applying synchronizing pulses to said diode switch for passage through one of said diodes to said flip-flop circuit depending on the condition of said biasing means.

22. A time separation telephone system comprising a plurality of lines, a plurality of trunks, a common transmission path, gating means for connecting said trunks to said path in time sequence, each of said trunks being assigned a time slot in said sequence during which it is connected to said path by said gating means, and means for connecting said lines to said path in particular time slots to connect said lines to the trunks assigned said particular time slots, said last-mentioned means comprising memory means including a delay line and means for repeatedly circulating pulses through said delay line, the total delay of said memory means being the time sequence between the recurrence of any one time slot, means for inserting pulses into said delay line in any time slot assigned to a trunk identifying a line to which that trunk is to be connected, and means for recognizing a request in any time slot from any one of said lines and trunks to be connected through said path to any other one of said lines and trunks.

23. A time separation telephone system in accordance with claim 22 wherein said recognizing means further comprises means for receiving information from said path in any time slot and means for disabling said last-mentioned means during all other time slots than said any time slot.

24. A time separation telephone system comprising a plurality of trunks, a plurality of lines, a common transmission path, means assigning each of said trunks to a particular time slot in a repeated time sequence, memory means comprising a delay line and means for continuously circulating pulses through said delay line, said pulses identifying said lines, means for connecting each of said trunks successively to said common path in the time slot assigned thereto, means for inserting pulses into said memory means in the time slot of any of said trunks, means for regenerating said pulses on each transit through said delay line, means for connecting said lines to said common path under control of said pulses in said memory means, said lines being thereby connected to particular ones of said trunks in the time slots of said trunks, and means for erasing said pulses from said memory means, said erasing means comprising means for recognizing an erase order on said common path in any time slot, means operative only on the repeated presence of said order in successive time sequences for generating an erase pulse, and means operative on the disappearance of said order for resetting said last-mentioned means.

25. A time separation telephone system comprising a plurality of trunks, a plurality of lines, a common transmission path, first gating means for connecting any one of said trunks to said path, second gating means for connecting any one of said lines to said path, means for enabling said first gating means to connect each of said trunks individually and in time sequence to said path in a particular time slot in said time sequence, memory means comprising a closed circuit including a delay line and means for circulating pulses through said delay line, the total delay of said closed circuit being the period between the same time slot in successive time sequences, means for inserting a signal at a point in said closed circuit identifying a particular one of said lines, said signal being inserted in a time slot assigned a particular one of said trunks, and means for enabling said second gating means on each traversal of said closed circuit path by said signal to connect said particular line to said path when said particular trunk is connected to said path by said first gating means.

26. A time separation switching system comprising a plurality of first communication paths, a plurality of second communication paths, a common transmission path, means for connecting each of said first communication paths in succession to said common transmission path, each of said first communication paths being connected in a particular one of plurality of time slots in a repeated time sequence, memory means, means for inserting a signal in said memory means identifying a particular one of said second communication paths, said memory means associating said inserted signal with a first one of said time slots, and means responsive to signals from said memory means to connect said particular second communication path to said common transmission path in said first one of said time slots.

27. A time separation switching system comprising a plurality of first lines on which may appear communication and supervisory signals, a plurality of second lines, means for defining a plurality of time slots which recur in repetitive cycles, means for detecting supervisory signals appearing on calling ones of said first lines during a distinct one of said time slots reserved for supervisory signal detection, means controlled by said detecting means for registering designations of said calling lines and called ones of said second lines, and means controlled in accordance with the registered designations of said calling and called lines for completing a connection for the transmittal of communication signals between the calling and called lines.

28. A time separation switching system comprising a plurality of first lines, a plurality of second lines, a common link, means for defining a plurality of time slots in a recurrent time sequence, means for selectively connecting said first lines to said link during one of said time slots reserved for supervisory signal detection, means connected to said link for detecting supervisory signals appearing on calling ones of said first lines during said one of said time slots, means controlled by said last-named means for registering designations of said calling lines and called ones of said second lines, and means controlled in accordance with the registered designations of said calling and called lines for completing a connection for the transmittal of communication signals between the calling and called lines over said link.

References Cited in the file of this patent

UNITED STATES PATENTS

| | | |
|---|---|---|
| 2,492,344 | Adams et al. | Dec. 27, 1949 |
| 2,577,141 | Mauchly et al. | Dec. 4, 1951 |
| 2,619,548 | Lesti | Nov. 25, 1952 |
| 2,649,505 | Ransom et al. | Aug. 18, 1953 |
| 2,716,159 | Flowers | Aug. 23, 1955 |
| 2,754,367 | Levy | July 10, 1956 |
| 2,773,934 | Trousdale et al. | Dec. 11, 1956 |
| 2,857,463 | Trousdale | Oct. 21, 1958 |